United States Patent
Hikosaka et al.

(10) Patent No.: US 6,538,063 B1
(45) Date of Patent: Mar. 25, 2003

(54) RESIN COMPOSITION, BINDER RESIN FOR TONER AND TONER

(75) Inventors: Takaaki Hikosaka, Sodegaura (JP); Hiroyuki Tamura, Sodegaura (JP); Haruo Shikuma, Sodegaura (JP); Kouichi Matono, Sodegaura (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 09/787,906

(22) PCT Filed: Sep. 28, 1999

(86) PCT No.: PCT/JP99/05281
§ 371 (c)(1),
(2), (4) Date: May 31, 2001

(87) PCT Pub. No.: WO00/18840
PCT Pub. Date: Apr. 6, 2000

(30) Foreign Application Priority Data

Sep. 29, 1998 (JP) ............................................. 10-274520
Jun. 30, 1999 (JP) ............................................. 11-186672

(51) Int. Cl.⁷ ........................... C08G 63/48; G03G 9/00
(52) U.S. Cl. ............................. 525/54.44; 430/109.1; 430/109.3
(58) Field of Search .................... 525/54.44; 430/109.1, 430/109.3

(56) References Cited

U.S. PATENT DOCUMENTS 3,985,665 A    10/1976  Sakaguchi et al.
5,569,716 A  * 10/1996  Okamoto et al. ............ 525/192
6,040,388 A  *  3/2000  Nishimura et al. ......... 525/332.1

FOREIGN PATENT DOCUMENTS

| | | |
|---|---|---|
| JP | 50-43935 | 8/1973 |
| JP | 54-94524 | 7/1979 |
| JP | 56-154737 | 11/1981 |
| JP | 59-152970 | 8/1984 |
| JP | 6-263943 | 9/1994 |
| JP | 7-11078 | 1/1995 |
| JP | 8-106174 | 4/1996 |
| JP | 11-52611 | 2/1999 |

* cited by examiner

Primary Examiner—Mark A. Chapman
(74) Attorney, Agent, or Firm—Oblon, Spivak, McClelland, Maier & Neustadt, P.C.

(57) ABSTRACT

The invention is [1] a resin composition comprising a resin obtained by polymerizing cyclopentadiene or the like and a specific styrene resin, [2] a resin composition comprising (a) a polystyrene-type polymer component and (b) a specific petroleum resin-based polymer component, and [3] a toner binder resin for development of an electrostatically charged image comprising (A) a terpene resin or the like and (B) a styrene resin and/or a polyester resin. Further, it is a toner binder resin for development of an electrostatically charged image containing these resin compositions as a main component, and a toner for development of an electrostatically charged image comprising the toner binder resin and a coloring material.

11 Claims, No Drawings

RESIN COMPOSITION, BINDER RESIN FOR TONER AND TONER

TECHNICAL FIELD

The present invention relates to a toner used to develop an electrostatic latent image formed in an electrophotographic method, an electrostatic recording method, an electrostatic printing method and the like, a binder resin used therein, and a resin composition which is a material thereof.

BACKGROUND OF THE INVENTION

In recent years, in order to attain coloration and energy saving in an electrophotographic copying machine or printer and the like, a low-temperature fixing-type toner has been developed. For achieving the low-temperature fixing, it is effective to decrease a heat-softening temperature of a toner resin. Generally, however, when a heat-softening temperature of a resin is decreased, a glass transition temperature of the toner is decreased at the same time. Accordingly, so-called toner blocking by which a toner forms a block in a storage state tends to occur, for which the fixing temperature cannot be decreased as desired.

In order to meet contradictory requirements of both the low-temperature fixability and the anti-blocking property, for example, Japanese Patent Laid-Open No. 1,952/1981 proposes a method using a polyester resin of which the fixing temperature is low though the affinity for paper is high and the heat-softening temperature and the glass transition temperature are high. In this case, although the low-temperature fixability and the anti-blocking property are improved to some extent, both of the properties are not satisfied enough at the same time. Besides, a polyester resin involves a problem that since it has high cohesive energy density, pulverization becomes difficult in production of a toner.

Meanwhile, Japanese Patent Laid-Open No. 257,868/1992 proposes a toner using a petroleum resin excellent in melting property and low-temperature fixability. Further, Japanese Patent Laid-Open No. 278,658/1996 proposes a toner using a hydrogenated petroleum resin. In these toners using the petroleum resin and the hydrogenated petroleum resin, however, the heat-softening temperature is low despite the high glass transition temperature. Accordingly, the low-temperature fixability is excellent, but the resins themselves are brittle, and it is difficult to use these resins singly as a toner resin. Further, almost all of these petroleum resins are a resin in which an aliphatic unsaturated bond remains in more than 50% of a petroleum resin before hydrogenation, a resin obtained by polymerizing a $C_9$ monomer unpurified or simply purified and a hydrogenated aromatic petroleum resin having a hydrogenation rate of less than 10%. For this reason, all of these resins are colored yellow to brown. When these are incorporated in amounts of more than 35% by weight, there is a problem that a binder resin is strongly colored and color reproducibility is not satisfactorily obtained for coloration and also for monochrome. Further, since an active double bond is oxidized with air and a hydrophilic group tends to occur, there was also a likelihood that electricity stability in storage of a toner becomes poor.

Moreover, some of the petroleum resins used in these documents have a high content of a volatile component, and there is a likelihood that an odor is given off by heating in fixation at approximately 150° C. which is a general fixing temperature. Therefore, there is also a problem that the proportion of the petroleum resin cannot be increased to a composition of more than 35% by weight at which the low-temperature fixability becomes good.

In addition, Japanese Patent Laid-Open Nos. 274,520/1998, 52,611/1999, 52,612/1999, 52,614/1999 and 52,615/1999 propose a binder resin using a petroleum resin good in low-temperature fixability and hue and free from an odor in fixation. These have excellent performance in practical use. However, the petroleum resins are themselves incompatible with a polystyrene resin incorporated to have a binder resin exhibit suitable mechanical strength (the binder resin is not too strong nor brittle). Accordingly, both the components are hardly kneaded with high uniformity, and transparency of the resulting composition is not satisfactory. When this is applied to a toner for coloration, there is a problem that color reproducibility of transmitted light is not satisfactory.

Moreover, the use of a resin composition obtained by incorporating a styrene-acrylic resin or a polyester resin in these petroleum resins has been also proposed. In this case, the low-temperature fixability and the grindability in the production of a toner were improved, but were not said to be satisfactory.

DISCLOSURE OF THE INVENTION

The invention aims to provide a toner excellent in low-temperature fixability, having mechanical strength capable of enduring practical use as a toner and low environmental dependence in charging a toner, free from an odor in fixation and excellent in transparency, a binder resin for obtaining the toner having such characteristics and a resin composition which is a material thereof.

The invention includes the following first invention, second invention and third invention.

That is, the gist of the first invention is as follows.

[1] A resin composition comprising a resin (component A) obtained by polymerizing at least one monomer selected from cyclopentadiene, dicyclopentadiene and dihydrodicyclopentadiene and a styrene resin (component B) in which a content of a structural unit derived from styrene is 70% by weight or more.

[2] A toner binder resin for development of an electrostatically charged image using a resin composition comprising a resin (component A) obtained by polymerizing at least one monomer selected from cyclopentadiene, dicyclopentadiene and dihydrodicyclopentadiene and a styrene resin (component B) in which a content of a structural unit derived from styrene is 70% by weight or more.

[3] A toner binder resin for development of an electrostatically charged image using a resin composition in which component A is a resin obtained by subjecting at least one monomer selected from cyclopentadiene, dicyclopentadiene and dihydrodicyclopentadiene to cationic polymerization, heat polymerization or radical polymerization and/or a resin obtained by hydrogenating a part or the whole of a carbon-carbon unsaturated bond and/or an aromatic ring of these copolymers and component B is a styrene resin in which a content of a structural unit derived from styrene is 70% by weight or more and which has a weight-average molecular weight of 15,000 to 1,000,000 and a number-average molecular weight of 1,400 to 300,000.

[4] A toner binder resin for development of an electrostatically charged image using a resin composition in which component A is a copolymer resin obtained by copolymerizing (a) at least one monomer selected from cyclopentadiene, dicyclopentadiene and dihydrodicyclopentadiene and (b) at least one aromatic vinyl compound selected from styrene, α-methylstyrene, vinyltoluene, isopropenyltoluene, indene, alkyl-substituted indene, allylbenzene, allyltoluene, tert-butylstyrene and tert-butylallylbenzene and/or a resin obtained by hydrogenating a part or the whole of a carbon-carbon unsaturated bond and/or an aromatic ring of these copolymer resins and component B is a styrene resin in which a content of a structural unit derived from styrene is 70% by weight or more and which has a weight-average molecular weight of 15,000 to 1,000,000 and a number-average molecular weight of 1,400 to 300,000.

[5] A toner binder resin for development of an electrostatically charged image using a resin composition in which component A is a copolymer resin obtained by copolymerizing (a) at least one monomer selected from cyclopentadiene, dicyclopentadiene and dihydrodicyclopentadiene and (c) at least one conjugated diolefin selected from isoprene, butadiene and 1,3-pentadiene and/or a resin obtained by hydrogenating a part or the whole of a carbon-carbon unsaturated bond and/or an aromatic ring of these copolymer resins and component B is a styrene resin in which a content of a structural unit derived from styrene is 70% by weight or more and which has a weight-average molecular weight of 15,000 to 1,000,000 and a number-average molecular weight of 1,400 to 300,000.

[6] The toner binder resin for development of an electrostatically charged image as recited in any of [2] to [5], wherein the content [A/(A+B)] of component A is 0.3 to 0.99.

[7] The toner binder resin for development of an electrostatically charged image as recited in any of [2] to [5], wherein the content [A/(A+B)] of component A is 0.71 to 0.99.

[8] The toner binder resin for development of an electrostatically charged image as recited in any of [2] to [7], which toner binder resin has brittleness that as a break mark in exerting load according to a micro-Vickers hardness meter on a plate obtained by subjecting the resin to hot press molding and having a thickness of 400 to 450 μm, a visible crack having a length of 2 mm or more occurs at most once only in 10 tests under load of 300 gf and a visible crack having a length of 2 mm or more occurs at least eight times in 10 tests under load of 1,000 gf.

[9] A toner for development of an electrostatically charged image, containing the binder resin as recited in any of [2] to [8] as a toner binder resin for development of an electrostatically charged image.

[10] A toner binder resin for fixation with a heating roll using the toner binder resin for development of an electrostatically charged image as recited in any of [2] to [8].

[11] A toner for fixation with a heating roll using the toner for development of an electrostatically charged image as recited in [9].

Further, the gist of the second invention is as follows.

[1] A resin composition comprising (a) 1 to 99% by weight of a polystyrene-type polymer component and (b) 1 to 99% by weight of a petroleum resin-based polymer component in which when the petroleum resin-based polymer forms a resin composition with the polystyrene resin-type polymer at a weight ratio of 1:1, total light transmission measured according to JIS K 7105 on a film-like molded product of the resin composition having a thickness of 3 mm is 60% or more of a quantity of incident light.

[2] The resin composition as recited in [1], wherein when the petroleum resin-based polymer as component (b) forms a resin composition with the polystyrene-type polymer as component (a) at a weight ratio of 1:1, total light transmission measured according to JIS K 7105 on a film-like molded product of the resin composition having a thickness of 3 mm is 60% or more of a quantity of incident light, and haze measured according to JIS K 7105 is 40% or less.

[3] The resin composition as recited in [1] or [2], which comprises (a) 10 to 65% by weight of the polystyrene-type polymer component and (b) 35 to 90% by weight of the petroleum resin-based polymer component.

[4] The resin composition as recited in [1] or [2], which comprises (a) 10 to 49% by weight of the polystyrene-type polymer component and (b) 51 to 90% by weight of the petroleum resin-based polymer component.

[5] The resin composition as recited in any of [1] to [4], wherein the polystyrene-type polymer component (a) is a styrene homopolymer and/or a styrene-unsaturated carboxylic ester copolymer in which a ratio of a content of a styrene unit to a content of an unsaturated carboxylic ester unit is 1.1 or more in terms of a weight ratio.

[6] The resin composition as recited in any of [1] to [5], wherein the petroleum resin-based polymer component (b) is a petroleum resin-based polymer having a softening temperature of 130° C. or less.

[7] The resin composition as recited in any of [1] to [6], wherein the petroleum resin-based polymer component (b) is an aromatic petroleum resin.

[8] The resin composition as recited in any of [1] to [7], wherein the petroleum resin-based polymer component (b) is a polymer or a copolymer of one or more selected from the group consisting of vinyltoluene, α-methylstyrene, isopropenyltoluene and indene.

[9] The resin composition as recited in any of [1] to [8], wherein the petroleum resin-based polymer component (b) is an ester group-containing dicyclopentadiene polymer-based petroleum resin having a saponification value of 10 to 400 mg KOH/g.

[10] The resin composition as recited in any of [1] to [9], wherein the petroleum resin-based polymer component (b) is a hydroxyl group-containing dicyclopentadiene polymer-based petroleum resin having a hydroxyl value of 10 to 400 mg KOH/g.

[11] The resin composition as recited in any of [1] to [10], wherein the petroleum resin-based polymer component (b) is one in which a part or the whole of the unsaturated bond and/or the aromatic ring is hydrogenated.

[12] The resin composition as recited in any of [1] to [11], wherein the petroleum resin-based polymer component (b) is a petroleum resin-based polymer having weight loss of 1% by weight or less as measured at 150° C. by thermogravimetry.

[13] The resin composition as recited in any of [1] to [12], wherein the petroleum resin-based polymer component (b) is a petroleum resin-based polymer having a Gardener color number of 3 or less as measured in a molten condition according to JIS K 5400.

[14] The resin composition as recited in any of [1] to [13], wherein the petroleum resin-based polymer component (b) is a petroleum resin-based polymer having a Hazen color number of 250 or less as measured according to JIS K 6901.

[15] A toner binder resin for development of an electrostatically charged image, containing the resin composition as recited in any of [1] to [14] as a main component.

[16] A toner for development of an electrostatically charged image, comprising 100 parts by weight of the toner binder resin as recited in [15] and 0.1 to 100 parts by weight of a coloring material.

[17] A toner for development of an electrostatically charged image, comprising 100 parts by weight of the toner binder resin as recited in [15], 0.1 to 100 parts by weight of a coloring material and 0.1 to 10 parts by weight of a charge control agent.

[18] The toner for development of an electrostatically charged image as recited in [16] or [17], wherein wax is further added in an amount of 0.1 to 10 parts by weight per 100 parts by weight of the toner binder resin.

[19] The toner particles for development of an electrostatically charged image as recited in any of [16] to [18], wherein a volume-average particle diameter is 5 to 15 μm.

[20] A method for producing the toner particles for development of an electrostatically charged image as recited in [19], wherein a kneaded product of the toner as recited in any of [16] to [18] is ground, and particles having a volume-average particle diameter of 5 to 15 μm are classified.

Moreover, the gist of the third invention is as follows.

[1] A toner binder resin for development of an electrostatically charged image, containing at least one resin selected from (a) a terpene resin, (b) a rosin resin and (c) a hydrogenated aromatic petroleum resin.

[2] The toner binder resin for development of an electrostatically charged image as recited in [1], wherein the content of at least one resin selected from (a) a terpene resin (b) a rosin resin and (c) a hydrogenated aromatic petroleum resin is 5 to 100% by weight.

[3] A toner binder resin for development of an electrostatically charged image, containing (A) at least one resin selected from (a) a terpene resin, (b) a rosin resin and (c) a hydrogenated aromatic petroleum resin, and (B) a styrene resin and/or a polyester resin.

[4] The toner binder resin for development of an electrostatically charged image as recited in [3], wherein the weight ratio ((A)/(B)) of component (A) and component (B) is 90/10 to 15/85.

[5] The toner binder resin for development of an electrostatically charged image as recited in [3] or [4], wherein the styrene resin (B) is polystyrene and/or a styrene/unsaturated carbonyl compound copolymer resin.

[6] The toner binder resin for development of an electrostatically charged image as recited in any of [1] to [5], wherein the terpene resin (a) contains a component derived from at least one selected from α-pinene, β-pinene and dipentene.

[7] The toner binder resin for development of an electrostatically charged image as recited in any of [1] to [6], wherein the terpene resin (a) is a copolymer of a terpene and an aromatic vinyl compound.

[8] The toner binder resin for development of an electrostatically charged image as recited in any of [1] to [6], wherein the terpene resin (a) is a copolymer of a terpene and a phenolic compound.

[9] The toner binder resin for development of an electrostatically charged image as recited in any of [1] to [8], wherein the terpene resin (a) is one in which a part or the whole of the aliphatic unsaturated bond and/or the aromatic ring is hydrogenated.

[10] The toner binder resin for development of an electrostatically charged image as recited in any of [1] to [9], wherein-the rosin resin (b) is a rosin ester resin.

[11] The toner binder resin for development of an electrostatically charged image as recited in any of [1] to [9], wherein the rosin resin (b) is a rosin-modified maleic acid resin.

[12] The toner binder resin for development of an electrostatically charged image as recited in [10] or [11], wherein the rosin resin (b) is one in which a part or the whole of the aliphatic unsaturated bond and/or the aromatic ring is hydrogenated.

[13] The toner binder resin for development of an electrostatically charged image as recited in any of [1] to [12], wherein the hydrogenated aromatic petroleum resin (c) is one obtained by hydrogenating a part or the whole of an aromatic ring in a resin formed by polymerizing or copolymerizing at least one monomer selected from α-methylstyrene, vinyltoluene, isopropenyltoluene and indene.

[14] A toner for development of an electrostatically charged image, containing the binder resin as recited in any of [1] to [13] as a toner binder resin for development of an electrostatically charged image.

[15] A toner binder resin for fixation with a heating roll using the toner binder resin for development of an electrostatically charged image as recited in any of [1] to [13].

[16] A toner for fixation with a heating roll using the toner for development of an electrostatically charged image as recited in [14].

BEST MODE FOR CARRYING OUT THE INVENTION

The mode for carrying out the invention is described below.

I. First Invention

The resin composition of the first invention (hereinafter sometimes simply referred to as "the invention" in this column) is a resin composition comprising a resin (component A) obtained by polymerizing at least one monomer selected from cyclopentadiene, dicyclopentadiene and dihydrodicyclopentadiene and a styrene resin (component B) in which a content of a structural unit derived from styrene is 70% by weight or more.

As the cyclopentadiene resin used herein as component A of this resin composition may be a homopolymer of any of cyclopentadiene, dicyclopentadiene and dihydrodicyclopentadiene or a copolymer thereof. A part or the whole of a carbon-carbon unsaturated bond or an aromatic ring present in the polymer or the copolymer may be hydrogenated.

Further, this component A may be a copolymer of (a) at least one monomer selected from cyclopentadiene, dicyclopentadiene and dihydrodicyclopentadiene and (b) at least one aromatic vinyl compound selected from styrene, α-methylstyrene, vinyltoluene, isopropenyltoluene, indene, alkyl-substituted indene, allylbenzene, allyltoluene, tert-butylstyrene and tert-butylallylbenzene. Still further, this component A may be a copolymer of (a) at least one monomer selected from cyclopentadiene, dicyclopentadiene and dihydrodicyclopentadiene and (c) at least one conjugated diolefin selected from isoprene, butadiene and 1,3-pentadiene. Furthermore, it may be one obtained by hydrogenating a part or the whole of a carbon-carbon unsaturated bond or an aromatic ring present in these copolymers.

With respect to the resin used as component A, especially preferable examples of the copolymer include a styrene-dicyclopentadiene copolymer [styrene:dicyclopentadiene= 90:10 to 0:100 (weight ratio)], an indene-dicyclopentadiene copolymer, an indene-styrene-dicyclopentadiene copolymer (indene; indene, methylindene: styrene; styrene, α-methylstyrene, vinyltoluene, isopropenyltoluene: dicyclopentadiene; dicyclopentadiene, dihydrodicyclopentadiene], a dicyclopentadiene polymer and one obtained by hydrogenating a part or the whole of a carbon-carbon unsaturated bond and/or an aromatic ring present in these resins.

And, the content of the structural unit based on cyclopentadiene, dicyclopentadiene or dihydrodicyclopentadiene contained in these copolymers is preferably 10 to 100% by weight. This is because when the content of the structural unit is less than 10% by weight, the low-temperature fixability sometimes cannot satisfactorily be exhibited when it is used as a toner binder resin.

Further, with respect to the resin used as component A, a resin that is not hydrogenated and a resin obtained by hydrogenating a part or the whole of a carbon-carbon unsaturated bond or an aromatic ring present in the resin can favorably be used. However, when the hydrogenated resin is used, a resin hydrogenated such that a hydrogenation rate; a value of [(bromine value before hydrogenation−bromine value after hydrogenation)/(bromine value before hydrogenation)]×100 reaches 55% or more is preferable because when a resin composition is formed using this, a product having low environmental dependence in charging a toner is obtained. The bromine value of the resin used as component A can be any value. However, a bromine value of 30 g/100 g or less is preferable from the aspect of environmental stability in charging a toner or stability in storage. Further, when the resin is used for color, requirements, for example, its hue and transparency are strict. Thus, a resin obtained by hydrogenation such that this bromine value is 10 g/100 g or less or further 5 g/100 or less is preferable.

Moreover, with respect to the resin used as component A in which the aromatic ring is hydrogenated, brittleness of the resin composition or various requirements such as compatibility with the resin as component B, hue, transparency and the like can be met by adjusting a hydrogenation rate; a value of [(content of an aromatic ring before hydrogenation −content of an aromatic ring after hydrogenation)/(content of an aromatic ring before hydrogenation)]×100 found from an absorption peak intensity at wavenumber of 700 $cm^{-1}$ in infrared absorption analysis to between 0 and 100%. From the standpoint of compatibility with the resin as component B, it is preferably 90% or less. From the standpoint of hue and transparency, it is preferably 10% or more.

Next, as the styrene resin used as component B, a resin in which a content of the structural unit derived from styrene is 70% by weight or more is used. A resin having a weight-average molecular weight of 15,000 to 1,000,000 and a number-average molecular weight of 1,400 to 300,000 is especially preferable.

And, examples of the compound used in copolymerization with styrene in the styrene resin include aromatic ring-containing vinyl compounds such as α-methylstyrene, vinyltoluene, isopropenyltoluene, indene, alkyl-substituted indene, allylbenzene, allyltoluene, tert-butylstyrene, tert-butylallylbenzene and the like; α-olefins such as ethylene, propylene, 1-butene, 1-pentene, 1-hexene, 1-heptene, 1-octene, 1-decene and the like; chlorine-substituted ethylenes such as vinyl chloride, vinylidene chloride, 1,2-dichloroethylene, trichloroethylene, tetrachloroethylene and the like; vinyl fluoride, vinylidene fluoride, 1,2-difluoroethylene, trifluoroethylene, tetrafluoroethylene and the like. Further, acrylic compounds such as an acrylic ester, a methacrylic ester, acrylonitrile and the like, and compounds having a hydrophilic group or a polyvalent vinyl group, such as vinyl acetate, maleic acid, maleic ester, maleic anhydride, butadiene, isoprene and the like can also be used unless the effects of the invention are impaired.

Regarding the resin as component B, a resin in which a content of a structural unit derived from styrene is 70% by weight or more is used. The reason is that when a resin in which a content is less than 70% by weight is used, it is sometimes difficult to satisfactorily maintain the suitable brittleness of the resulting resin composition, the environmental dependence in charging a toner and the grindability.

With respect to the molecular weight of the resin as component B, when the weight-average molecular weight is less than 15,000 or the number-average molecular weight is less than 1,400, the resulting resin composition becomes brittle, and is unsuitable in the use as a toner binder resin. And, a resin having the weight-average molecular weight exceeding 1,000,000 or the number-average molecular weight exceeding 300,000 sometimes decreases the kneading property with component A and the grindability of the resulting resin composition.

Next, with respect to the mixing ratio of the resin as component A and the resin as component B, the content of component A [A/(A+B)] is 0.3 to 0.99, further preferably 0.71 to 0.99. In this case, regarding the resins of these components A and B, they may be used either singly or in combination. When the content of component A is less than 0.3 in the mixing ratio of both the components, there is a high possibility that the low-temperature fixability is decreased. Further, when the content of this component A exceeds 0.99, the resin composition becomes brittle, and is unsuitable in the use as a toner binder resin. Moreover, when the resin composition is used as a toner binder resin in the range of 0.71 to 0.99 as a preferable range of the content of component A, a balance of properties such as the low-temperature fixability, the grindability and the environmental dependence in charging a toner is especially good.

Further, the glass transition temperature of this resin composition is preferably 50° C. or more, more preferably 60° C. or more. When the glass transition temperature of this resin composition is less than 50° C., a toner produced by using the same tends to cause toner blocking by which the toner is agglomerated during the storage thereof.

And, with respect to the heat-softening temperature of this resin composition, a composition having a heat-softening temperature of 80 to 140° C., preferably 100 to 130° C. is favorably used. When the heat-softening temperature is less than 80° C., the toner particles tend to be agglomerated in a equipment before development by a frictional heat or the like. Moreover, when the heat-softening temperature exceeds 140° C., the low-temperature fixability is sometimes insufficient.

In addition, the mechanical strengths of this resin composition are also important properties in practical use along with the thermal properties. Accordingly, with respect to the resins used as components A and B being structural components of the resin composition, as stated above, resins which have appropriate mechanical strengths, especially controlled brittleness by adjusting the molecular weight, the copolymerization composition thereof or the like are preferably used.

The thus-controlled resin composition has brittleness that in a micro-Vickers hardness test using a test piece (thickness 400 to 450 μm) obtained by hot-pressing the resin composition, a visible crack having a length of 2 mm or more occurs at most once only in 10 tests under load of 300 gf and a visible crack having a length of 2 mm or more occurs at least eight times in 10 tests under load of 1,000 gf.

When a visible crack having a length of 2 mm or more occurs more than once in 10 tests under load of 300 gf or less in the micro-Vickers harness test, the resin composition is brittle, and hot offset tends to occur. Further, there is a likelihood that the toner is finely divided and reduced in a developing machine or an image printed is thinned by friction. And, when a visible crack having a length of 2 mm or more occurs less than eight times in 10 tests, the resin composition has too strong mechanical strengths, and it takes great energy and much time to grind the toner. Further, the low-temperature fixability is likely to be decreased.

The thus-obtained toner binder resin of the invention is especially appropriate as a binder resin of a toner for contact heat pressure fixation with a heating roll.

Next, the toner for development of an electrostatically charged image in the invention contains one or more of the toner binder resins as a toner resin. And, the content of the toner binder resin in this toner resin is not particularly limited. It is usually 1% by weight or more, preferably 70% by weight or more. When the content of the toner binder resin is less than 1% by weight, its addition effect is not satisfactory. When the content is 1% by weight or more, the effect is satisfactorily exhibited. Especially when it is 70% by weight or more, the grindability in the production of the toner becomes better.

In the toner of the invention, an elastomer can be used as a toner resin along with the toner binder resin unless the effects of the invention are impaired. The combined use of this elastomer improves Theological characteristics in melting, and an offset generating temperature becomes high. This elastomer is not particularly limited, and any of known elastomers can selectively be used.

As this elastomer, for example, nitrile rubber, ethylene propylene rubber, chloroprene rubber, silicone rubber, fluororubber, ethylene acrylic rubber, polyester elastomer, epichlorohydrin rubber, acrylic rubber, liquid rubber, polyethylene chloride, butadiene rubber, a styrene-butadiene copolymer, natural rubber, 1,2-polybutadiene, butyl rubber, polyethylene chlorosulfonate, polysulfide rubber, urethane rubber, a styrenic thermoplastic elastomer, an olefinic thermoplastic elastomer, a urethane-based thermoplastic elastomer, an ester-based thermoplastic elastomer, a polyvinyl chloride-based thermoplastic elastomer, butyl rubber-grafted polyethylene, trans-1,4-polyisoprene ionomer, a natural rubber-based thermoplastic elastomer and the like are available. Of these elastomers, a styrene-butadiene copolymer is especially preferable. And, these elastomers may be used either singly or in combination.

Further, when these elastomers are used in combination as the toner binder resin, the content of the elastomer based on the total toner resin is preferably 30% by weight or less. When this content exceeds 30% by weight, there is a possibility that the grindability in the toner production is decreased.

Moreover, in the toner of the invention, wax can be used as a toner resin along with the toner binder resin. The combined use of the wax can improve releasability of the toner. This wax is not particularly limited, and any of known waxes can selectively be used.

Preferable examples of this wax include animal and plant waxes, carnauba wax, candelilla wax, Japan wax, beeswax, mineral wax, petroleum wax, paraffin wax, microcrystalline wax, petrolactam, polyethylene wax, oxidized polyethylene wax, polypropylene wax, oxidized polypropylene wax, higher fatty acid wax, higher fatty acid ester wax, carnauba wax, Fischer-Tropsch wax and the like. Further, as a resin having the same properties as wax, a styrene oligomer, an amorphous poly-α-olefin and the like are preferably used. Of these, Fischer-Tropsch wax and a styrene oligomer are especially preferable. These waxes may be used either singly or in combination.

Moreover, when the binder resin of the invention and the wax are used in combination, the content of the wax based on the total toner resin is preferably 30% by weight or less. When the content exceeds 30% by weight, there is a likelihood that the decrease in glass transition temperature is invited to decrease the anti-blocking property.

Further, in the toner of the invention, a known thermoplastic resin can be used in combination as required. Examples of the thermoplastic resin include polyester resins [alcohol component; α,ω-alkylene diols ($C_2$–$C_{12}$) such as ethylene glycol, diethylene glycol, triethylene glycol, propylene glycol, 1,4-bis(hydroxymethyl)cyclohexane, bisphenol A, bisphenol A-ethylene glycol-modified diol, 1,3-propylene glycol and the like, hydrogenated bisphenol A, bisphenol F, bisphenol F-ethylene glycol-modified diol, bisphenol S, bisphenol S-ethylene glycol-modified diol, bisphenol, biphenol-ethylene glycol-modified diol, neopentyl glycol and trihydric or higher hydric alcohol: carboxylic acid component; aliphatic dicarboxylic acid, alicyclic dicarboxylic acid, aromatic dicarboxylic acid and tribasic or higher basic carboxylic acid], polystyrene, chloropolystyrene, poly-α-methylstyrene, poly-4-methoxystyrene, poly-4-hydroxystyrene, a styrene-chlorostyrene copolymer, a styrene-propylene copolymer, a styrene-vinyl chloride copolymer, a styrene-maleic acid copolymer, a styrene-vinyl acetate copolymer, a styrene-acrylic ester copolymer (methyl, ethyl, butyl, octyl and phenyl esters), a styrene-methacrylic ester copolymer (methyl, ethyl, butyl, octyl and phenyl esters), a styrene-methyl α-chloroacrylate copolymer, a styrene-acrylonitrile-acrylic ester copolymer, an α-methylstyrene-acrylic ester copolymer (methyl, ethyl, butyl, octyl and phenyl esters), an α-methylstyrene-methacrylic ester copolymer (methyl, ethyl, butyl, octyl and phenyl esters), an α-methylstyrene-methyl α-chloroacrylate copolymer, an α-methylstyrene-acrylonitrile-acrylic ester copolymer, a vinyl chloride resin, a rosin-modified maleic acid resin, a phenol resin, an epoxy resin, a polyethylene resin, a polypropylene resin, an ionomer resin, a polyurethane resin, a silicone resin, a ketone resin, an ethylene-ethyl acrylate copolymer, a xylene resin, a polyvinyl butyral resin and the like. These thermoplastic resins may be used either singly or in combination.

To the toner of the invention or the toner resin used therein, an appropriate amount of a known antioxidant may be added as required. As the antioxidant, a hindered phenol-based antioxidant, an aromatic amine-based antioxidant, a hindered amine-based antioxidant, a sulfide-based antioxidant, an organophosphorus-based antioxidant and the like are available. Of these, a hindered phenol-based antioxidant is preferable. The antioxidants may be used either singly or in combination.

Further, to the toner of the invention or the toner resin used therein, other than the foregoing additives, for example, an age resistor, an antiozonant, an ultraviolet absorber, a light stabilizer, a softening agent, a reinforcing agent, a filler, a mastication accelerator, a foaming agent, a foaming aid, a lubricant, an inner release agent, a flame retardant, an antistatic agent for kneading, a colorant, a coupling agent, an antiseptic, a flavor and the like may be added as required.

The toner for development of an electrostatically charged image in the invention usually contains 25 to 95% by weight of a toner binder (toner resin), 0 to 10% by weight of a colorant, 0 to 70% by weight of a magnetic powder, 0 to 10% by weight of a charge control agent and 0 to 10% by weight of a lubricant. Further, 0 to 1.5% by weight of a fluidizing agent and 0 to 1.5% by weight of a cleaning aid are added as external additives.

As the colorant, organic or inorganic colorants such as carbon black, copper oxide, manganese dioxide, aniline black, activated carbon, nonmagnetic ferrite, magnetic ferrite, magnetite, iron black, benzidine yellow, disazo yellow, quinacridone, a naphthol-based azo pigment, quinacridone, Rhodamine B, phthalocyanine, titanium white, zinc oxide and the like are available. By the way, when a magnetic powder in a magnetic toner itself is colored (black), the colorant is not necessarily used. As the magnetic powder, for example, iron, cobalt, nickel, magnetite, hematite, ferrite and the like are used. The particle diameter of the magnetic powder is selected in the range of, usually 0.05 to 1 $\mu$m, preferably 0.1 to 0.5 $\mu$m.

Further, the charge control agent is a substance capable of providing positive or negative charge by frictional charging. As this substance, for example, nigrosine base EX (made by Orient Chemical Industries, Co., Ltd.), P-51 (made by Orient Chemical Industries, Co., Ltd.), Copy Charge PXVP 435 (made by Hoechst Corp.), alkoxylamine, alkylamide, a molybdic acid chelate pigment, PLZ 1001 (made by Shikoku Chemicals Corporation), BONTRON S-22 (made by Orient Chemical Industries, Co., Ltd.), BONTRON S-34 (made by Orient Chemical Industries, Co., Ltd.), BONTRON E-81 (made by Orient Chemical Industries, Co., Ltd.), BONTRON E-84 (made by Orient Chemical Industries, Co., Ltd.), Spilon black TRH (made by Hodogaya Chemical Co., Ltd.), a thioindigo-based pigment, Copy Charge NXVP 434, BONTRON E-89 (made by Orient Chemical Industries, Co., Ltd.), magnesium fluoride, fluorocarbon, a hydroxycarboxylic acid metal complex, a dicarboxylic acid metal complex, an amino acid metal complex, a diketone metal complex, a diamine metal complex, a metal complex having an azo group-containing benzene-benzene derivative skeleton, a metal complex having an azo group-containing benzene-naphthalene derivative skeleton, benzyldimethylhexadecylammonium chloride, decyltrimethylammonium chloride, a metal complex, a nigrosine base, nigrosine hydrochloride, safranine, crystal violet, a quaternary ammonium salt, an alkylsalicylic acid metal complex, a calix allene-based compound, a boron compound, a fluorine-containing quaternary ammonium salt, an azo-based metal complex, a triphenylmethane dye, dibutyltin oxide and the like are available.

As the lubricant, for example, polytetrafluoroethylene, a low-molecular polyolefin, an aliphatic acid, a metal salt and an amide thereof and the like can be used.

Meanwhile, as the fluidizing agent used as an external additive, for example, inorganic fine particles having a particle diameter of several tens of nanometers, specifically, colloidal silica, alumina, titanium oxide, zinc oxide, magnesium fluoride, silicon carbide, boron carbide, titanium carbide, zirconium carbide, boron nitride, titanium nitride, zirconium nitride, magnetite, molybdenum disulfide, aluminum stearate, magnesium stearate, zinc stearate and the like can be used. These fluidizing agents may be rendered hydrophobic with a silane-based or titanium-based coupling agent, a higher fatty acid, silicone oil, a surfactant or the like.

Further, preferable examples of the cleaning aid used as an external additive include fine particles of polystyrene, polymethyl methacrylate, polyacrylate, polybenzoguanamine, a silicone resin, polytetrafluoroethylene, polyethylene, polypropylene and the like.

A method for producing the toner of the invention is not particularly limited. A known method such as a mechanical grinding method, a spray-drying method, a chemical polymerization method, a wet granulation method or the like can be used. Of these, the mechanical grinding method is a method in which the toner components are dry-blended, melt-kneaded, then coarsely crushed, finally finely ground with a jet mill or the like, and further, as required, classified for controlling the particle diameter to obtain fine particles having a volume-average particle diameter of 5 to 20 $\mu$m.

The thus-formed toner for development of an electrostatically charged image is used as a developer for two-component development by being mixed with carrier particles, or is singly used as a developer for monocomponent development. As the carrier herein, for example, a magnetic powder carrier, a magnetic powder resin-coated carrier, a binder carrier, a glass bead and the like are available. The particle diameter of these carriers is usually 20 to 500 $\mu$m.

As the magnetic powder carrier, for example, metals such as iron, nickel, ferrite, magnetite, cobalt and the like, alloys or mixtures of these metals and metals such as zinc, antimony, aluminum, lead, tin, bismuth, beryllium, manganese, selenium, tungsten, zirconium, vanadium and the like, metal oxides such as iron oxide, titanium oxide, magnesium oxide and the like, nitrides such as chromium nitride, vanadium nitride and the like, mixtures with carbides such as silicon carbide, tungsten carbide and the like, and so forth are available.

As the magnetic powder resin-coated carrier, a carrier in which the foregoing magnetic powder particles are used as a core and coated with the following resins is used. As the coating resin, for example, polyethylene, a silicone resin, a fluororesin, a styrene resin, an acrylic resin, a styrene-acrylic resin, polyvinyl acetate, cellulose derivatives, a maleic acid resin, an epoxy resin, polyvinyl chloride, polyvinylidene chloride, polyvinyl bromide, polyvinylidene bromide, a polycarbonate, a polyester, polypropylene, a phenol resin, polyvinyl alcohol, a fumaric ester resin, polyacrylonitrile, polyvinyl ether, chloroprene rubber, an acetal resin, a ketone resin, a xylene resin, butadiene rubber, a styrene-butadiene copolymer, polyurethane and the like can be used. This magnetic powder resin-coated carrier may contain, as required, conductive fine particles (carbon black, conductive metal oxide and metallic powder), inorganic fillers (silica, silicon nitride, boron nitride, alumina, zirconia, silicon carbide, boron carbide, titanium oxide, clay, talc and glass fibers), the charge control agents mentioned above and the like. The film thickness of the resin coated on the carrier core is preferably 0.1 to 5 $\mu$m.

The toner for development of an electrostatically charged image in the invention is used by being transferred and fixed on a support (paper, an OHP film such as a polyester or the like). As the fixing method, for example, press fixing, heat fixing (SURF fixing, fixing with a hot plate, oven fixing, infrared lamp fixing or the like), contact heat-pressure fixing, flash fixing, solvent fixing and the like can be applied. Contact heat-pressure fixing with a heating roll is preferable. And, in this case, the lowest fixing temperature of a toner is preferably 140° C. or less. A toner capable of the low-temperature fixing at 130° C. or less is especially preferable.

The toner of the invention can be applied as a toner of any type of magnetic monocomponent development, magnetic two-component development, nonmagnetic monocomponent development, nonmagnetic two-component development and liquid development. It is advantageously used as a toner for magnetic monocomponent development, magnetic two-component development and nonmagnetic monocomponent development.

The toner of the invention can be applied to various development methods. For example, it can be applied to a magnetic brush development method, a cascade development method, a method using a conductive magnetic toner described in the specification of U.S. Pat. No. 3,909,258, a method using a highly resistant magnetic toner as described in Japanese Patent Laid-Open No. 31,136/1978, a method described in Japanese Patent Laid-Open Nos. 42,121/1979, 18,656/1980 and 43,027/1979, a fur brush development method, a powder clouding method, an impression development method, a microtoning method, a contact development method, a touchdown development method, a magnedynamic development method, a jumping method, an FEED (Floating Electrode Effect Development) method, an FMT (Fine Micro Toning System) development method, NSP (Non Magnetic Single Component Development Process) and the like can be applied.

The toner of the invention can be applied to any machine of corona charge (corotron system, scorotron system or the like) and contact charge (charge roll system, charge brush system or the like). Further, a method having no cleaning step, a blade method, a fur brush method, a magnetic brush method, a roller cleaning method and the like are available. A blade method and a method having no cleaning step are preferable.

Next, the toner of the invention can be applied to any of an organic electrophotographic photoreceptor (layered type or single-layer type) and an inorganic photoreceptor (amorphous silicon, amorphous selenium, selenium-based photoreceptor or germanium-based photoreceptor). It is especially preferable to apply the same to an organic electrophotographic photoreceptor and an inorganic photoreceptor using amorphous silicon.

Moreover, the toner of the invention has characteristics that it can be applied to (1) any of a reversible development process and a normal development process, (2) any of positively charged and negatively charged toners, (3) any of monochromic and color printers, (4) any of an analog printing machine and a digital printing machine, and (5) a copying machine, a printer (a laser beam printer, a liquid crystal printer or the like), a facsimile and a combined machine of these.

II. Second Invention

The resin composition in the second invention (hereinafter sometimes simply referred to as "the invention" in this column) is a substantially transparent resin composition comprising (a) 1 to 99% by weight of a polystyrene-type polymer component and (b) 1 to 99% by weight of a petroleum resin-based polymer component in which when the petroleum resin-based polymer forms a resin composition with the polystyrene-type polymer at a weight ratio of 1:1, total light transmission measured according to JIS K 7105 on a film-like molded product of the resin composition having a thickness of 3 mm is 60% or more of a quantity of incident light. And, with respect to the composition ratio of the polystyrene-type polymer component as component (a) and the petroleum resin-based polymer as component (b), it is preferable that the polystyrene-type polymer component (a) is 10 to 65% by weight and the petroleum resin-based polymer component (b) is 35 to 90% by weight. Further, it is especially preferable that the polystyrene-type polymer component (a) is 10 to 49% by weight and the petroleum resin-based polymer component (b) is 51 to 90% by weight, because a resin composition having such an appropriate mechanical strength that it is not too strong nor brittle and can withstand practical use is obtained.

Next, the polystyrene-type polymer used as component (a) of the resin composition may be a styrene homopolymer or a styrene-acrylic copolymer in which a weight ratio of a content of an unsaturated carboxylic ester unit to a content of a styrene unit in the copolymer is 1:1 or more. As this unsaturated carboxylic ester, unsaturated carboxylic esters comprising unsaturated carboxylic acids such as acrylic acid, methacrylic acid, maleic acid, fumaric acid, maleic anhydride and the like and alcohols containing 1 to 18 carbon atoms or hydroxy compounds, or those obtained by copolymerizing acrylonitrile and the like as a comonomer are used. As an alkyl group present in an ester moiety of the unsaturated carboxylic esters, a methyl group, an ethyl group, a propyl group, a butyl group, a pentyl group, a hexyl group, a heptyl group, an octyl group, a nonyl group, a decyl group, an undecyl group, a dodecyl group, a stearyl group and the like are used. In addition, a phenyl group and a benzyl group are also available. In these unsaturated carboxylic esters, especially preferable examples of the comonomer of the polystyrene-type copolymer used as component (a) include methyl acrylate, ethyl acrylate, butyl acrylate, methyl methacrylate, ethyl methacrylate, butyl methacrylate, isobutyl methacrylate and 2-ethylhexyl methacrylate.

Further, with respect to the copolymer of styrene and unsaturated carboxylic esters, a copolymer in which a weight ratio of a content of a styrene unit (structural unit made of the styrene residue in the polymer chain) to a content of an unsaturated carboxylic ester unit (structural unit made of the unsaturated carboxylic ester residue in the polymer chain) is higher than 1.1 is preferably used. The reason is that when the weight ratio is less than 1.1, the properties of the copolymer are strongly influenced by the properties of the unsaturated carboxylic ester homopolymer to decrease compatibility with the petroleum resin-based polymer as component (b), and further despite the same molecular weight, the melt index of this copolymer is decreased so that the kneading property of both the components is poor and the glass transition temperature is decreased to invite the decrease in anti-blocking property.

Besides, with respect to the molecular weight of the polystyrene-type polymer, in either the styrene homopolymer or the copolymer of styrene and the unsaturated carboxylic esters, the weight-average molecular weight measured by gel permeation chromatography and calculated as polystyrene is 40,000 to 1,000,000, preferably 100,000 to 400,000, and the number-average molecular weight is 10,000 to 500,000, preferably 40,000 to 200,000. When the weight-average molecular weight of the polystyrene-type polymer as component (a) is less than 40,000 or the number-average molecular weight thereof is less than 10,000, there is a possibility that the mechanical strengths of the resin composition comprising this and the petroleum resin-based polymer as component (b) are decreased and a large amount of a finely divided component is formed in the toner production to decrease the productivity of the toner or to decrease the storage stability of a printed image when it is used as a toner for development of an electrostatically charged image. Moreover, when the weight-average molecular weight of the polystyrene-type polymer exceeds 1,000,000 or the number-average molecular weight thereof exceeds 500,000, the softening temperature of the resin composition comprising this and the petroleum resin-based polymer as component (b) becomes too high, which makes the low-temperature fixing difficult. Further, the mechanical strengths become too high, which sometimes invites the decrease in grindability of the toner for development of an electrostatically charged image. As the polystyrene-type polymer, a polymer containing a fluidity improver such as liquid paraffin or the like may be used.

Next, the petroleum resin-based polymer as component (b) used herein can properly be selected from those produced by subjecting a $C_5$ fraction or a $C_9$ fraction obtained through petroleum refining or naphtha thermal cracking to cationic polymerization, radical polymerization, heat polymerization, anionic polymerization, coordinated ionic polymerization, suspension polymerization, emulsion polymerization, polymerization with a transition metal complex catalyst or the like. These petroleum resins include an aliphatic petroleum resin obtained by using a $C_4$–$C_5$ fraction as a starting material, a dicyclopentadiene-based petroleum resin obtained by using a fraction composed mainly of dicyclopentadiene as a starting material, an aromatic petroleum resin obtained by using a $C_8$–$C_{10}$ fraction having a high content of an aromatic hydrocarbon such as styrene, vinyltoluene, methylstyrene, isopropenyltoluene, indene, alkyl-substituted indene or the like as a starting material and a copolymer thereof according to the type of the polymerizable monomer used as the starting material.

And, in the production of these petroleum resins, as the polymerizable monomer being the starting material, fractions obtained from a petroleum refining step are, in many cases, used in the polymerization as such, or the fractions subjected to simple purification are singly used in the polymerization or plural such fractions are mixed and used in the polymerization. After each monomer is separated and purified, it is singly used in the polymerization, or plural such monomers are mixed and used in the polymerization. In this case, a petroleum resin obtained by separating and purifying each monomer and polymerizing the same provides uniform physicochemical properties. Thus, it is preferably applied to usage requiring high-level control of properties, for example, to a toner resin.

Further, preferable examples of a polymerization method in producing a petroleum resin by polymerizing these monomers include a Friedel-Crafts-type cationic polymerization method using a Lewis acid and a heat polymerization method. In case of the Friedel-Crafts-type cationic polymerization method, aluminum chloride, aluminum bromide, dichloroethylaluminum, titanium tetrachloride, tin tetrachloride, boron trifluoride and the like are used as a catalyst, and aromatic hydrocarbons such as toluene, xylene, ethylbenzene, mesitylene cumene, cymene and the like, aliphatic hydrocarbons such as pentane, hexane, heptane, octane, cyclohexane, cyclopentane, methylcyclohexane and the like, and mixtures thereof are used as a polymerization solvent. And, the ratio of the catalyst used is 0.01 to 5 parts by weight, preferably 0.05 to 3 parts by weight per part by weight of the monomer. A polymerization temperature varies with the type of the monomer or the type of the catalyst. The polymerization is conducted at −20 to 60° C. An appropriate polymerization time is 0.5 to 5 hours. Further, after the polymerization, the catalyst is decomposed with an alkaline aqueous solution, methanol or the like, and washed with water, and a low polymer, an unreacted monomer and a solvent are removed under reduced pressure to obtain a purified petroleum resin.

Since the thus-obtained petroleum resin contains unsaturated bonds or aromatic rings in various forms in the polymer chain, a petroleum resin of which the properties are improved by hydrogenating these unsaturated bond sites can be obtained. The hydrogenation reaction of the petroleum resin can be conducted by a known method. For example, it is advisable that a petroleum resin having an unsaturated bond is dissolved in a solvent such as hexane, heptane, octane, cyclohexane, methylcyclohexane, decalin, benzene, toluene, xylene or the like, a catalyst such as nickel, palladium, ruthenium, rhodium, cobalt, platinum, tungsten, chromium, molybdenum, rhenium, manganese or the like is added thereto and the reaction is conducted at 0 to 350° C., preferably 150 to 260° C. and a hydrogen pressure of normal pressure to 200 kg/cm², preferably 30 to 100 kg/cm². In this case, a catalyst supported on a carrier such as alumina, silica, zeolite, diatomaceous earth or the like may be used.

When the thus-obtained petroleum resin is used as a petroleum resin-based polymer being component (b) of the resin composition in the invention, the weight-average molecular weight is preferably 400 to 5,000. When the weight-average molecular weight of the petroleum resin used as component (b) is less than 400, the mechanical strength of the resin composition comprising this and component (a) is likely to be unsatisfactory. Further, when the weight-average molecular weight exceeds 5,000, the low-temperature fixability of the toner obtained by using the resin composition comprising this and component (a) is likely to be unsatisfactory.

Regarding the petroleum resin used as component (b) of the resin composition of the invention, the softening temperature thereof is lower than 130° C., more preferably lower than 120° C. This is because when the softening temperature of the petroleum resin as component (b) is higher than 130° C., the low-temperature fixability of the toner for development of an electrostatically charged image produced by using the resin composition comprising this and component (a) is sometimes unsatisfactory. Further, with respect to the softening temperature of the petroleum resin, a ½ outflow temperature measured using a flow tester is 80 to 130° C., preferably 90 to 130° C. When this temperature is less than 80° C., a toner for development of an electrostatically charged image produced by using the resin composition containing this as component (b) tends to cause toner blocking during storage thereof. Further, when this temperature exceeds 140° C., the low-temperature fixability of the toner using the same is sometimes not obtained satisfactorily.

Further, the bromine value of the petroleum resin used as component (b) is not particularly limited unless the total light transmission of the resin composition obtained by mixing this with component (a) is less than 60% of the quantity of incident light. It is 60 g/100 g or less, preferably 10 g/100 g or less. This is because when the bromine value exceeds 60 g/100 g, the coloration occurs drastically and the total light transmission of the resin composition obtained by mixing this with component (a) is liable to be less than 60% of the quantity of incident light.

And, the content of the aromatic hydrocarbon unit contained in the polymer chain of the petroleum resin used as this component (b) is not particularly limited unless the total light transmission of the resin composition comprising this and component (a) at the weight ratio of 1:1 is 60% or more, preferably 80% or more and the haze is 40% or less, preferably 15% or less. An aromatic petroleum resin, a hydrogenated aromatic petroleum resin, an aromatic-aliphatic petroleum resin, a hydrogenated aromatic-aliphatic petroleum resin, an aromatic-dicyclopentadiene polymer-based petroleum resin and a hydrogenated aromatic-dicyclopentadiene polymer-based petroleum resin in an amount of 30% by weight or more, preferably 40% by weight or more can be used. Of these various petroleum resins, especially an aromatic petroleum resin or an aromatic copolymer-based petroleum resin having a high content of an aromatic hydrocarbon group is preferably used because it is excellent in compatibility with the polystyrene-type polymer as component (a).

And, among aromatic petroleum resins appropriate as the petroleum resin-based polymer used as component (b), an aromatic petroleum resin produced from one or more monomers selected from vinyltoluene, α-methylstyrene, isopropenyltoluene and indene as a starting material by a Friedel-Crafts-type cationic polymerization method or a heat-polymerization method using a Friedel-Crafts catalyst, a Lewis acid or the like is appropriately used because of excellent hue.

Moreover, as this petroleum resin-based polymer component (b), a compound in which at least a part of the unsaturated bond and/or the aromatic ring is hydrogenated is also preferably used.

Further, as the petroleum resin-based polymer as component (b), an ester group-containing dicyclopentadiene polymer-based petroleum resin having the saponification value of 10 to 400 mg KOH/g can be used. When the content of the aromatic hydrocarbon unit contained in the polymer chain of the petroleum resin is low, it has low compatibility with the polystyrene-type polymer. However, by introducing a functional group into the petroleum resin, the compatibility with the polystyrene-type polymer can be improved. Especially, an ester group-containing dicyclopentadiene polymer-based petroleum resin obtained by introducing a maleic ester, an acrylic ester, a methacrylic ester or the like into an unsaturated bond site of a polymer chain of a dicyclopentadiene polymer-based petroleum resin through a polymerization reaction is excellent in compatibility with the polystyrene-type polymer as component (a). The ratio of the ester group introduced herein is 10 to 400 mg KOH/g, preferably 50 to 300 mg KOH/g in terms of a saponification value. When this saponification value is less than 10 mg KOH/g, the compatibility with the polystyrene-type polymer as component (a) is insufficient. Further, when this saponification value exceeds 400 mg KOH/g, charging characteristics of the toner using the resin composition comprising this and component (a) is liable to be decreased. Moreover, a hydroxyl group-containing dicyclopentadiene polymer-based petroleum resin having a hydroxyl value of 10 to 400 mg KOH/g, preferably 50 to 300 mg KOH/g, more preferably 100 to 250 mg KOH/g can be used. When this hydroxyl value is less than 10 mg KOH/g, the compatibility with component (a) is insufficient. When it exceeds 400, charging characteristics are liable to be decreased.

In addition, as the petroleum resin-based polymer as component (b), it is advisable to use a polymer in which weight loss at 150° C. of a volatile component contained therein as measured in air at room temperature to 600° C. with a rate of rise of 10° C./min by thermal gravimetry (TG-DTA) is 1% by weight or less, preferably 0.7% by weight or less. Such a petroleum resin-based polymer having the weight loss at 150° C. of 1% by weight or less can be obtained by a method in which an ingredient incapable of polymerization is removed from a starting material before the polymerization or a method in which after the polymerization of a petroleum resin starting material, the heating is conducted under reduced pressure to remove a low polymer or an unreacted product. When a toner for development of an electrostatically charged image produced using as a binder resin a resin composition containing a petroleum resin-based polymer in which weight loss at 150° C. exceeds 1% by weight is used herein, an odor is sometimes given off in fixing the toner for development of an electrostatically charged image at approximately 150° C.

With respect to the hue of the petroleum resin as component (b), the Gardener color number measured in a molten condition according to JIS K 5400 is 3 or less, preferably 2 or less. Further, with respect to the hue of the petroleum resin, when the Hazen color number measured according to JIS K 6901 is 250 or less, the total light transmission of the resin composition obtained by using the same is increased, and a toner binder resin excellent in transparency can be obtained. The petroleum resin having the Gardener color number of 3 or less or the Hazen color number of 250 or less can be obtained by a method in which the resin starting material is purified well and polymerized, a method in which the polymerization is conducted at a low temperature or a method in which an aliphatic unsaturated bond of a colored petroleum resin formed by polymerization is hydrogenated.

Next, when the polystyrene-type polymer as component (a) and the petroleum resin as component (b) are kneaded to produce the resin composition, it can be conducted using a melt kneader ordinarily employed in molding a thermoplastic resin. The resin composition obtained herein is formed by melt-kneading both the components (a) and (b) at the composition ratio of 1 to 99% by weight. More preferably, the composition ratio is that the polystyrene-type polymer as component (a) is 10 to 65% by weight and the petroleum resin as component (b) is 35 to 90% by weight. Further preferably, the composition ratio is that the polystyrene-type polymer as component (a) is 10 to 49% by weight and the petroleum resin as component (b) is 51 to 90% by weight.

When the weight ratio of component (a) to component (b) is 1:1 in the thus-obtained resin composition, it is a substantially transparent resin composition in which the total light transmission measured according to JIS K 7105 on a film-like molded product having a thickness of 3 mm is 60% or more of the quantity of incident light. Further, a resin composition excellent in transparency can be obtained in which haze that is a ratio, expressed by percentage, of scattered light transmission to total light transmission as measured on a film-like molded product of this resin composition having a thickness of 3 mm is 40% or less.

Further, the glass transition temperature of this resin composition is preferably 50° C. or more, more preferably 60° C. or more. When the glass transition temperature of this resin composition is less than 50° C., a toner produced by using this tends to cause toner blocking by which agglomeration occurs during storage thereof.

And, the outflow starting temperature of the resin composition measured by the flow tester is 80 to 140° C., preferably 100 to 130° C. When this outflow starting temperature is less than 80° C., the toner particles tend to be agglomerated within the unit before development by frictional heat or the like. Further, when the outflow starting temperature exceeds 140° C., the low-temperature fixability is sometimes insufficient.

Further, in the toner of the invention, wax can be used as a toner resin along with the toner binder resin. The combined use of this wax can improve releasability of the toner. The wax is not particularly limited, and any of known waxes can selectively be used. Specifically, those described in the first invention are applied. Of these, polyethylene wax, polypropylene wax, oxidized polyethylene wax and oxidized polypropylene wax are preferable. These waxes may be used either singly or in combination.

Moreover, when the binder resin of the invention and the wax are used in combination, the content of the wax based on the total toner resin is preferably 30% by weight or less. When the content exceeds 30% by weight, there is a possibility that the decrease in glass transition temperature is invited to decrease the anti-blocking property.

Further, a known thermoplastic resin can jointly be used, as required, in the toner of the invention. As the thermoplastic resin, specifically, those described in the first invention are applied. These thermoplastic resins can be used either singly or in combination.

To the toner of the invention or the toner resin used therein, an appropriate amount of a known antioxidant may be added as required. As the antioxidant, a hindered phenol-based antioxidant, an aromatic amine-based antioxidant, a hindered amine-based antioxidant, a sulfide-based antioxidant, an organophosphorus-based antioxidant and the like are available. Of these, a hindered phenol-based antioxidant is preferable. The antioxidants may be used either singly or in combination.

Further, to the toner of the invention or the toner resin used therein, other than the foregoing additives, for example, an age resistor, an antiozonant, an ultraviolet absorber, a light stabilizer, a softening agent, a reinforcing agent, a filler, a mastication accelerator, a foaming agent, a foaming aid, a lubricant, an inner release agent, a flame retardant, an antistatic agent for kneading, a colorant, a coupling agent, an antiseptic, a flavor and the like may be added as required.

The toner for development of an electrostatically charged image in the invention usually contains 25 to 95% by weight of a toner binder (toner resin), 0 to 10% by weight of a colorant, 0 to 70% by weight of a magnetic powder, 0 to 10 by weight of a charge control agent and 0 to 10% by weight of a lubricant. Further, 0 to 1.5% by weight of a fluidizing agent and 0 to 1.5% of a cleaning aid are added as external additives.

As the colorant, specifically, those described in the first invention are applied. As the magnetic powder, for example, iron, cobalt, nickel, magnetite, hematite, ferrite and the like are used. The particle diameter of the magnetic powder is selected in the range of, usually 0.05 to 1 $\mu$m, preferably 0.1 to 0.5 $\mu$m.

Further, the charge control agent is a substance capable of providing positive or negative charge by frictional charging. Specifically, those described in the first invention are applied.

As the lubricant, for example, polytetrafluoroethylene, a low-molecular polyolefin, an aliphatic acid, a metal salt and an amide thereof, and the like can be used.

Meanwhile, as the cleaning aid used as an external additive, specifically, those described in the first invention are applied.

Further, preferable examples of the cleaning aid used as an external additive include fine particles of polystyrene, polymethyl methacrylate, polyacrylate, polybenzoguanamine, a silicone resin, polytetrafluoroethylene, polyethylene, polypropylene and the like.

A method for preparing the toner of the invention is not particularly limited. A known method such as a mechanical grinding method, a spray-drying method, a chemical polymerization method, a wet granulation method or the like can be used. Of these, the mechanical grinding method is a method in which the toner components are dry-blended, melt-kneaded, then coarsely crushed, finally finely ground with a jet mill or the like, and further, as required, classified for controlling the particle diameter to obtain fine particles having a volume-average particle diameter of 5 to 15 $\mu$m.

The thus-formed toner for development of an electrostatically charged image is used as a developer for two-component development by being mixed with carrier particles, or is singly used as a developer for monocomponent development. As the carrier herein, for example, a magnetic powder carrier, a magnetic powder resin-coated carrier, a binder carrier, a glass bead and the like are applied. The particle diameter of these carriers is usually 20 to 500 $\mu$m.

As the magnetic powder carrier, specifically, those described in the first invention are applied.

As the magnetic powder resin-coated carrier, a carrier in which the foregoing magnetic powder particles are used as a core and coated with the following resins is used. As the coating resin, specifically, those described in the first invention are applied. This magnetic powder resin-coated carrier may contain, as required, conductive fine particles (carbon black, conductive metal oxide and metallic powder), inorganic fillers (silica, silicon nitride, boron nitride, alumina, zirconia, silicon carbide, boron carbide, titanium oxide, clay, talc and glass fibers), the charge control agents mentioned above and the like. The film thickness of the resin coated on the carrier core is preferably 0.1 to 5 $\mu$m.

The toner for development of an electrostatically charged image in the invention is used by being transferred and fixed on a support (paper, an OHP film such as a polyester or the like). As the fixing method, for example, press fixing, heat fixing (SURF fixing, fixing with a hot plate, oven fixing, infrared lamp fixing or the like), contact heat-pressure fixing, flash fixing, solvent fixing and the like can be applied. Contact heat-pressure fixing with a heating roll is preferable. And, in this case, the lowest fixing temperature of the toner is preferably 145° C. or less. A toner capable of the low-temperature fixing at 140° C. or less is especially preferable.

The toner of the invention can be applied as a toner of any type of magnetic monocomponent development, magnetic two-component development, nonmagnetic monocomponent development, nonmagnetic two-component development and liquid development. It is advantageously used for magnetic monocomponent development, magnetic two-component development and nonmagnetic monocomponent development.

The toner of the invention can be applied to various development methods. Specifically, it is applied to those described in the first invention.

The toner of the invention can be applied to any machine of corona charge (corotron system, scorotron system or the like) and contact charge (charge roll system, charge brush system or the like). Further, a method having no cleaning step, a blade method, a fur brush method, a magnetic brush method, a roller cleaning method and the like can be applied. A blade method and a method having no cleaning step are preferable.

Next, the toner of the invention can be applied to any of an organic electrophotographic photoreceptor (layered type or single-layer type) and an inorganic photoreceptor (amorphous silicon, amorphous selenium, selenium-based photoreceptor or germanium-based photoreceptor). It is especially preferable to apply the same to an organic electrophotographic photoreceptor and an inorganic photoreceptor using amorphous silicon.

Moreover, the toner of the invention has characteristics that it can be applied to (1) any of a reversible development process and a normal development process, (2) any of positively charged and negatively charged toners, (3) any of monochromic and color printing machines, (4) any of an analog printing machine and a digital printing machine, and (5) a copying machine, a printer (laser beam printer, a liquid crystal printer and the like), a facsimile and a combined machine of these.

III. Third Invention

The third invention (hereinafter sometimes simply referred to as "the invention" in this column) is [I] a toner binder resin for development of an electrostatically charged image, containing at least one resin selected from (a) a terpene resin, (b) a rosin resin and (c) a hydrogenated aromatic petroleum resin, and further [2] a toner binder resin for development of an electrostatically charged image, containing (A) at least one resin selected from (a) a terpene resin, (b) a rosin resin and (c) a hydrogenated aromatic petroleum resin, and (B) a styrene resin and/or a polyester resin.

As the terpene resin (a) herein, polymers obtained by using terpene compounds such as α-pinene, β-pinene, limonene, dipentene, camphene, $\Delta^3$-carene and the like as a starting material, copolymers of the same with other monomers and modified products of these polymers are applied. Of these, a component derived from at least one of α-pinene, β-pinene and dipentene, namely, a polymer or a copolymer obtained by using at least one of α-pinene, β-pinene and dipentene as a starting material, a copolymer of at least one of these and another monomer, and a modified product of the polymer or the copolymer are preferably used. As the copolymer, aromatic-terpene copolymers (copolymers of styrenes such as styrene, vinyltoluene, α-methylstyrene, β-methylstyrene, isopropenyltoluene and the like or indenes such as indene, methylindene and the like and terpenes), and terpene phenol resins (copolymer resins of phenols such as phenol, alkylphenol and the like and bisphenols such as bisphenol A, bisphenol F, bisphenol Z and the like and terpenes) are preferably used. Further, as the modified products of these resins, resins obtained by hydrogenating a part or the whole of an aliphatic unsaturated bond and/or an aromatic unsaturated bond are available. The content of the component derived from at least one of α-pinene, β-pinene and dipentene is preferably 30% by weight or more based on the terpene resin because appropriate mechanical strengths are provided.

(b) As the rosin resin, gum rosin, wood rosin, tall oil rosin and those obtained by processing and modifying them can be used. As the modified rosin, metal salts with zinc, calcium, magnesium and the like, ester rubbers (rosin esterified with alcohols such as glycerin, pentaerythritol, benzyl alcohol and the like), a rosin-maleic acid resin, a rosin-modified phenol resin, a rosin-modified alkyd resin, a hydrogenated rosin resin and the like are available. Of these, ester rubbers and a rosin-maleic acid resin are preferable.

Further, as the hydrogenated aromatic petroleum resin (c), a resin formed by using at least one aromatic vinyl compound selected from a $C_9$ fraction resulting from thermal cracking of petroleum naphtha, styrene, α-methylstyrene, β-methylstyrene, vinyltoluene, isopropenyltoluene, indene, alkyl-substituted indene, allylbenzene, allyltoluene, tert-butylstyrene and tert-butylallylbenzene as a starting material, subjecting the same to cationic polymerization, radical polymerization, heat polymerization, anionic polymerization, coordinated ionic polymerization, suspension polymerization, emulsion polymerization or polymerization with a transition metal complex catalyst, and then hydrogenating a part or the whole of an aromatic ring using a known aromatic ring hydrogenation catalyst such as nickel or the like is used. In the production of these petroleum resins, as the polymerizable monomer being the starting material, fractions obtained from a petroleum refining step are, in many cases, used in the polymerization as such, or the fractions are subjected to simple purification, and they are used singly in the polymerization or plural such fractions are mixed and used in the polymerization. After each monomer is separated and purified, it is singly used in the polymerization, or plural such monomers are mixed and used in the polymerization. In this case, a petroleum resin obtained by separating and purifying each monomer and polymerizing the same provides uniform physicochemical properties. Thus, it is preferably applied to usage requiring high-level control of properties, for example, to a toner resin. The hydrogenation rate of aromatics, (content of aromatics before hydrogenation–content of aromatics after hydrogenation)/(content of aromatics before hydrogenation)×100 (%) (content of aromatics was obtained from an absorption peak intensity at wavenumber of 700 $cm^{-1}$ in the infrared absorption analysis), is optional unless the effects of the invention are impaired. It is preferably 10 to 90%, more preferably 30 to 70%. When the hydrogenation rate is less than 10%, there is a likelihood that the resin is colored and an odor is given off in fixation after formation of a toner. When the hydrogenation rate exceeds 90%, there is a likelihood that the compatibility with polystyrene, a styrene-unsaturated carbonyl compound copolymer resin, a polyester or the like is decreased and a composition well kneaded is not obtained as will be described later. In case of the Friedel-Crafts-type cationic polymerization method, aluminum chloride, aluminum bromide, dichloroethylaluminum, titanium tetrachloride, tin tetrachloride, boron trifluoride and the like are used as a catalyst, and aromatic hydrocarbons such as toluene, xylene, ethylbenzene, mesitylene, cumene, cymene and the like, aliphatic hydrocarbons such as pentane, hexane, heptane, octane, cyclohexane, cyclopentane, methylcyclohexane and the like, and mixtures thereof are used as a polymerization solvent. And, the ratio of the catalyst used is 0.01 to 5 parts by weight, preferably 0.05 to 3 parts by weight per part by weight of the monomer. The polymerization temperature varies with the type of the monomer or the type of the catalyst. The polymerization is conducted at −20 to 60° C. An appropriate polymerization time is 0.5 to 5 hours. Further, after the polymerization, the catalyst is decomposed with an alkaline aqueous solution, methanol or the like, and washed with water, and a low polymer, an unreacted monomer and a solvent are removed under reduced pressure to obtain a purified petroleum resin. The hydrogenation reaction of the petroleum resin can be conducted by a known method. For example, it is advisable that a petroleum resin having an unsaturated bond is dissolved in a solvent such as hexane, heptane, octane, cyclohexane, methylcyclohexane, decalin, benzene, toluene, xylene or the like, a catalyst such as nickel, palladium, ruthenium, rhodium, cobalt, platinum, tungsten, chromium, molybdenum, rhenium, manganese or the like is added thereto, and the reaction is conducted at 0 to 350° C., preferably 150 to 260° C. and hydrogen pressure of normal pressure to 200 $kg/cm^2$, preferably 30 to 100 $kg/cm^2$. In this case, the catalyst may be supported on a carrier such as alumina, silica, zeolite, diatomaceous earth or the like. It is advisable that the thus-obtained petroleum resin has the weight-average molecular weight of 400 to 5,000. When the weight-average molecular weight is less than 400, the mechanical strength is liable to be unsatisfactory.

Further, when it exceeds 5,000, the low-temperature fixability of the resulting toner is liable to be unsatisfactory.

It is preferable that the softening temperature of the terpene resin, the rosin resin and the hydrogenated aromatic petroleum resin is 130° C. or less for attaining the low-temperature fixability. More preferably, it is 120° C. or less.

Further, the total amount of at least one resin selected from (a) a terpene resin, (b) a rosin resin and (c) a hydrogenated aromatic petroleum resin in the toner binder resin for development of an electrostatically charged image is 5 to 100% by weight, preferably 15 to 90% by weight, more preferably 30 to 80% by weight, further preferably 51 to 70% by weight in the toner binder resin for development of an electrostatically charged image in consideration of a balance of the low-temperature fixability and the mechanical strength. When it is less than 5% by weight, the low-temperature fixability is liable to be decreased.

Moreover, in the invention, it is advisable to use the styrene resin and/or the polyester resin (B) as the binder resin component.

As the styrene resin, polystyrene and/or a styrene-unsaturated carbonyl compound copolymer resin is preferable. As the unsaturated carbonyl compound, an acrylic ester, a methacrylic ester, acrylonitrile, a maleic ester, a fumaric ester, maleic anhydride and the like are used. In the ester moiety, alkyl groups, aryl groups and alkenyl groups such as methyl, ethyl, propyl, isopropyl, butyl, 2-butyl, pentyl, hexyl, heptyl, octyl, nonyl, decyl, undecyl, dodecyl, stearyl, 2-ethylhexyl, benzyl, phenyl, vinyl and allyl are selected. In case of a copolymer of styrene and an acrylic ester compound, the copolymer composition ratio: (styrene component/acrylic component) is preferably more than 1.1. When it is less than 1.1, the properties of the acrylic resin become too strong, involving problems that the kneading property is decreased due to the decrease in compatibility with the petroleum resin and the decrease in MI, the antiblocking property is decreased due to the decrease in Tg and the like.

The weight-average molecular weight of polystyrene and the styrene-unsaturated carbonyl compound copolymer resin is 40,000 to 1,000,000, preferably 10,000 to 400,000, and the number-average molecular weight thereof is 10,000 to 500,000, preferably 40,000 to 200,000. When the weight-average molecular weight is less than 40,000 or the number-average molecular weight is less than 10,000, the mechanical strength of the composition with the terpene resin and/or the rosin resin and/or the hydrogenated aromatic petroleum resin is unsatisfactory, and there is a problem with the storage stability of a printed image or the like. When the weight-average molecular weight is more than 1,000,000 or the number-average molecular weight is more than 500,000, the softening temperature and the mechanical strength of the composition with the terpene resin and/or the rosin resin and/or the hydrogenated aromatic petroleum resin are too high, and there are problems with the low-temperature fixability and the toner grindability. Further, this polystyrene-type polymer may contain a fluidity improver such as liquid paraffin or the like.

Further, it is possible to use, as the polyester resin, those obtained by using the starting materials, $\alpha,\omega$-alkylene diols ($C_2$–$C_{12}$) such as ethylene glycol, diethylene glycol, triethylene glycol, propylene glycol, 1,4-dihydroxycyclohexane, bisphenol A, bisphenol A-ethylene glycol modified diol, 1,3-propylene glycol and the like, dihydric alcohols such as hydrogenated bisphenol A, bisphenol F, bisphenol F-ethylene glycol modified diol, bisphenol S, bisphenol S-ethylene glycol modified diol, biphenol, biphenol-ethylene glycol modified diol, neopenty glycol and the like and trihydric or higher hydric alcohols such as glycerin and the like as an alcohol component, and $\alpha,\omega$-alkylenedicarboxylic acid ($C_2$–$C_{12}$), aliphatic dicarboxylic acids such as maleic acid, fumaric acid and the like, alicyclic dicarboxylic acids such as 1,4-cyclohexanedicarboxylic acid, 2,3-bicyclo[2,2,1]dicarboxylic acid and the like, aromatic dicarboxylic acids such as phthalic acid, isophthalic acid, terephthalic acid, naphthalenedicarboxylic acid, biphenylcarboxylic acid, 4,4'-bis(2,2-isopropylidene)dicarboxylic acid and the like, tribasic or higher basic carboxylic acids such as trimellitic acid and the like, acid halides and ester derivatives thereof and the like as a carboxylic acid component. These starting materials may be used either singly or in combination.

In the toner binder resin for development of an electrostatically charged image according to the invention, regarding the mixing ratio of (A) at least one resin selected from (a) the terpene resin, (b) the rosin resin and (c) the hydrogenated aromatic petroleum resin and (B) the styrene resin and/or the polyester resin, the weight ratio of component (A) and component (B)((A)/(B)) is 90/10 to 15/85, preferably 80/20 to 30/70, more preferably 70/30 to 51/49. The content (weight ratio) [A/(A+B)] of component (A) is appropriately 0.15 to 0.9, preferably 0.3 to 0.8, more preferably 0.51 to 0.7. In this case, the resins of component (A) and the resins of component (B) may be used either singly or in combination. In the mixing ratio of both the components, when the content of component (A) is less than 0.15, there is a possibility that the effect of the invention that the low-temperature fixability is excellent is not obtained. Further, when the content of component (A) exceeds 0.90, there is a possibility that the resin composition becomes brittle and is inappropriate for use as a toner binder resin. Further, when this resin composition is used as a toner binder in the range of 0.3 to 0.8 which is preferable as the content of component (A), the balance of the properties such as the low-temperature fixability, the grindability and the like is especially good. In the range of 0.51 to 0.7, the more preferable properties are provided.

Further, the glass transition temperature of this resin composition is preferably 50° C. or more, further preferably 60° C. or more. When the glass transition temperature of this resin composition is less than 50° C., the toner produced by using the same tends to cause toner blocking by which the toner is agglomerated during storage thereof. With respect to the heat-softening temperature, a composition having a heat-softening temperature of 80 to 140° C., preferably 100 to 130° C. is favorably used. When the heat-softening temperature is less than 80° C., the toner particles tend to be agglomerated in an equipment before development by a frictional heat or the like. Moreover, when the heat-softening temperature exceeds 140° C., the low-temperature fixability is sometimes insufficient.

In addition, the mechanical strengths of this resin composition are also important properties in practical use along with the thermal properties. Accordingly, with respect to the resins used as components (A) and (B) being structural components of the resin composition, resins which have appropriate mechanical strengths, especially controlled brittleness by adjusting the molecular weight, the copolymerization composition thereof or the like are preferably used.

The thus-obtained toner binder resin of the invention is especially appropriate as a binder resin of a toner for contact heat pressure fixation with a heating roll.

The toner for development of an electrostatically charged image in the invention contains one or more of the toner binder resins as a toner resin. And, the content of the toner binder resin in this toner resin is not particularly limited. It is usually 50% by weight or more, preferably 70% by weight or more. When the content of the toner binder is less than 50% by weight, there is a likelihood that the effects of the invention are not obtained satisfactorily. When the content is 50% by weight or more, the effects are satisfactorily exhibited. Especially when it is 70% by weight or more, the grindability in the production of the toner is good, and a toner good in low-temperature fixability also is provided.

In the toner of the invention, an elastomer can be used as a toner resin along with the toner binder resin unless the effects of the invention are impaired. The combined use of this elastomer improves Theological characteristics in melting, and an offset generating temperature is increased. This elastomer is not particularly limited, and any of known compounds can selectively be used.

With respect to this elastomer, specifically, those described in the first invention are applied. Of these elastomers, a styrene-butadiene copolymer is especially preferable. And, these elastomers may be used either singly or in combination.

Further, when the toner binder resin and these elastomers are used in combination, the content of the elastomer based on the total toner resin is preferably 30% by weight or less. When the content exceeds 30% by weight, the grindability in the production of the toner is liable to be decreased.

Moreover, in the toner of the invention, wax can be used as a toner resin along with the toner binder resin. The combined use of the wax can improve releasability of the toner. This wax is not particularly limited, and any of known waxes can selectively be used.

With respect to this wax, specifically, those described in the first invention are applied. Further, as a resin having the same properties as wax, a styrene oligomer, an amorphous poly-α-olefin and the like are preferably used. Of these, polyethylene wax, polypropylene wax, acid-modified polyethylene wax and acid-modified polypropylene wax are especially preferable. These waxes may be used either singly or in combination.

Moreover, when the binder resin of the invention and the wax are used in combination, the content of the wax based on the total toner resin is preferably 30% by weight or less. When the content exceeds 30% by weight, there is a possibility that the decrease in the glass transition temperature is invited to decrease the anti-blocking property.

In addition, in the toner of the invention, a known thermoplastic resin can jointly be used as required. With respect to this thermoplastic resin, specifically, those described in the invention are applied. These thermoplastic resins may be used either singly or in combination.

To the toner of the invention or the toner resin used therein, an appropriate amount of a known antioxidant may be added as required. As the antioxidant, a hindered phenol-based antioxidant, an aromatic amine-based antioxidant, a hindered amine-based antioxidant, a sulfide-based antioxidant, an organophosphorus-based antioxidant and the like are available. Of these, a hindered phenol-based antioxidant is preferable. The antioxidants may be used either singly or in combination.

Further, to the toner of the invention or the toner resin used therein, other than the foregoing additives, for example, an age resistor, an antiozonant, an ultraviolet absorber, a light stabilizer, a softening agent, a reinforcing agent, a filler, a mastication accelerator, a foaming agent, a foaming aid, a lubricant, an inner release agent, a flame retardant, an antistatic agent for kneading, a colorant, a coupling agent, an antiseptic, a flavor and the like may be added as required.

The toner for development of an electrostatically charged image in the invention usually contains 25 to 95% by weight of a toner binder (toner resin), 0 to 10% by weight of a colorant, 0 to 70% by weight of a magnetic powder, 0 to 10 by weight of a charge control agent and 0 to 10% by weight of a lubricant. Further, 0 to 1.5% by weight of a fluidizing agent and 0 to 1.5% of a cleaning aid are added as external additives.

As the colorant, specifically, those described in the first invention are applied. Further, as the magnetic powder, for example, iron, cobalt, nickel, magnetite, hematite, ferrite and the like are used. The particle diameter of the magnetic powder is selected in the range of, usually 0.05 to 1 $\mu$m, preferably 0.1 to 0.5 $\mu$m.

Further, the charge control agent is a substance capable of providing positive or negative charge by frictional charging. Specifically, those described in the first invention are applied.

As the lubricant, for example, polytetrafluoroethylene, a low-molecular polyolefin, an aliphatic acid, a metal salt and an amide thereof and the like can be used.

Meanwhile, with respect to the fluidizing agent and the cleaning aid used as external additives, specifically, those described in the first invention are also applied.

A method for producing the toner of the invention is not particularly limited. Specifically, those described in the first invention are applied.

The thus-formed toner for development of an electrostatically charged image is used as a developer for two-component development by being mixed with carrier particles, or is singly used as a developer for monocomponent development. As the carrier herein, for example, a magnetic powder carrier, a magnetic powder resin-coated carrier, a binder carrier, a glass bead and the like are applied. The particle diameter of these carriers is usually 20 to 500 $\mu$m.

As the magnetic powder carrier, specifically, those described in the first invention are applied. As the magnetic powder resin-coated carrier, a carrier in which the foregoing magnetic powder particles are used as a core and coated with the resin is used. As the coating resin, specifically, those described in the first invention are applied. This magnetic powder resin-coated carrier may contain, as required, conductive fine particles (carbon black, conductive metal oxide and metallic powder), inorganic fillers (silica, silicon nitride, boron nitride, alumina, zirconia, silicon carbide, boron carbide, titanium oxide, clay, talc and glass fibers), the charge control agents mentioned above and the like. The film thickness of the resin coated on the carrier core is preferably 0.1 to 5 $\mu$m.

The toner for development of an electrostatically charged image in the invention is used by being transferred and fixed on a support (paper, an OHP film such as a polyester or the like). As the fixing method, for example, press fixing, heat fixing (SURF fixing, fixing with a hot plate, oven fixing, infrared lamp fixing or the like), contact heat-pressure fixing, flash fixing, solvent fixing and the like can be applied. Contact heat-pressure fixing with a heating roll is preferable. And, in this case, the lowest fixing temperature of the toner is preferably 140° C. or less. A toner capable of the low-temperature fixing at 130° C. or less is especially preferable.

The toner of the invention can be applied as a toner of any type of magnetic monocomponent development, magnetic two-component development, nonmagnetic monocomponent development, nonmagnetic two-component development and liquid development. It is advantageously used as a toner for magnetic monocomponent development, magnetic two-component development and nonmagnetic monocomponent development.

The toner of the invention can be applied to various development methods. Specifically, those described in the first invention are available.

The toner of the invention can be applied to any machine of corona charge (corotron system, scorotron system or the like) and contact charge (charge roll system, charge brush system or the like). Further, a method having no cleaning step, a blade method, a fur brush method, a magnetic brush method, a roller cleaning method and the like are available. A blade method and a method having no cleaning step are preferable.

Next, the toner of the invention can be applied to any of an organic electrophotographic photoreceptor (layered type or single-layer type) and an inorganic photoreceptor (amorphous silicon, amorphous selenium, selenium-based photoreceptor or germanium-based photoreceptor). It is especially preferable to apply the same to an organic electrophotographic photoreceptor and an inorganic photoreceptor using amorphous silicon.

Moreover, the toner of the invention has characteristics that it can be applied to (1) any of a reversible development process and a normal development process, (2) any of positively charged and negatively charged toners, (3) any of monochromic and color printing machines, (4) any of an analog printing machine and a digital printing machine, and (5) a copying machine, a printer (a laser beam printer, a liquid crystal printer or the like), a facsimile and a combined machine of these.

By the way, the softening temperature, the average molecular weight, the aromatic ring content and the hydrogenation rate of the aromatic ring were measured by the following methods. Further, with respect to the softening temperature of the resin as the starting material alone in Examples to be described later, a value measured by a ring and ball method according to JIS K-2207 was described unless otherwise instructed.

(1) Softening Temperature

Measured by a ring and ball method according to JIS K-2207.

(2) Average Molecular Weight

A number-average molecular weight and a weight-average molecular weight calculated as polystyrene were measured by gel permeation chromatography (GPC).

(3) Aromatic Ring Content

Analyzed by infrared absorption analysis. It was determined from absorbance at wavenumber of 700 cm$^{-1}$ using carbon disulfide as a solvent.

The invention is illustrated more specifically below by referring to Examples. However, the invention is not limited thereto.

I. First Invention

Synthesis Example I-1

A 1-liter autoclave was charged with 272 g of xylene as a solvent, and heated up to 260° C. in an atmosphere of a nitrogen gas. A mixture of 170 g of dicyclopentadiene and 170 g of styrene was added over 2 hours while being stirred. And, while maintaining the temperature at 260° C., the reaction was further conducted for 140 minutes.

An unreacted product and a low polymer were distilled off from the thus-obtained polymer solution to obtain resin [Ia].

This resin [Ia] was made of a structural unit derived from dicyclopentadiene as component A and a structural unit derived from styrene as component B at a weight ratio of 50:50, and had properties, a number-average molecular weight of 610, a heat-softening temperature of 92° C., a bromine value of 60 g/100 g and an aromatic ring content of 44%.

Subsequently, a 1-liter autoclave was charged with 250 g of resin [Ia], 3.0 g of a nickel-diatomaceous earth catalyst and 250 g of cyclohexane as a solvent, and a hydrogenation reaction was conducted under conditions of a hydrogen pressure of 50 kg/cm$^2$·G and a temperature of 230° C. for 8 hours. After the completion of the reaction, the reaction product was cooled, and withdrawn. The catalyst was filtered off, and the solvent was then distilled off to obtain resin [IIa].

This resin [IIa] was made of a structural unit derived from dicyclopentadiene as component A and a structural unit derived from styrene as component B at a weight ratio of 50:50, and had properties, a heat-softening temperature of 125° C., a bromine value of 2.2 g/100 g, (bromine value of a hydrogenated resin/bromine value of an unhydrogenated resin)×100 of 3.7%, an aromatic ring content of 2.9% and a hydrogenation rate of an aromatic ring of 93%.

Incidentally, the softening temperature, the bromine value, the average molecular weight, the aromatic ring content and the hydrogenation rate of the aromatic ring were measured by the following methods.

(1) Softening Temperature

Measured by a ring and ball method according to JIS K-2207.

(2) Bromine Value

Measured according to JIS K-2605.

(3) Average Molecular Weight

A number-average molecular weight and a weight-average molecular weight calculated as polystyrene were measured by gel permeation chromatography (GPC).

(4) Aromatic Ring Content

Analyzed by infrared absorption analysis. It was determined from absorbance at wavenumber of 700 cm$^{-1}$ using carbon disulfide as a solvent.

(5) Hydrogenation Rate of an Aromatic Ring

Calculated using the formula.

Hydrogenation rate (%) of an aromatic ring=[1−(aromatic ring content of a hydrogenated resin/aromatic ring content of an unhydrogenated resin)]×100

Synthesis Example I-2

A 1-liter autoclave was charged with 228 g of xylene as a solvent, and heated up to 260° C. in an atmosphere of a nitrogen gas. A mixture of 190 g of dicyclopentadiene and 190 g of styrene was added over 2 hours while being stirred. And, while maintaining the temperature at 260° C., the reaction was further conducted for 4 hours.

An unreacted product and a low polymer were distilled off from the thus-obtained polymer solution to obtain resin [Ib].

This resin [Ib] was made of a structural unit derived from dicyclopentadiene as component A and a structural unit derived from styrene as component B at a weight ratio of 50:50, and had properties, a number-average molecular weight of 690, a heat-softening temperature of 110° C., a bromine value of 62 g/100 g and an aromatic ring content of 46%.

Subsequently, a 1-liter autoclave was charged with 250 g of resin [1b], 3.0 g of a nickel-diatomaceous earth catalyst and 250 g of cyclohexane as a solvent, and a hydrogenation reaction was conducted under conditions of a hydrogen pressure of 40 kg/cm$^2$·G and a temperature of 230° C. for 5 hours. After the completion of the reaction, the reaction product was cooled, and withdrawn. The catalyst was filtered off, and the solvent was then distilled off to obtain hydrogenated resin [IIb].

This resin [IIa] was made of a structural unit derived from dicyclopentadiene as component A and a structural unit derived from styrene as component B at a weight ratio of 50:50, and had properties, a heat-softening temperature of 125° C., a bromine value of 4.4 g/100 g, (bromine value of a hydrogenated resin/bromine value of an unhydrogenated resin)×100 of 7.1%, an aromatic ring content of 24% and a hydrogenation rate of an aromatic ring of 48%.

EXAMPLE I-1

Hydrogenated resin [IIb] (71 g) obtained in Synthesis Example I-2 and 29 g of polystyrene [IDEMITSU PS.HH made by Idemitsu Petrochemical Co., Ltd.] having a weight-average molecular weight of 300,000 were mixed in a powdery state, and then biaxially kneaded with a LABO-PLASTMILL having an inner temperature of 140° C. to obtain a resin composition with a composition ratio of both components A and B; [A/(A+B)]=0.71.

The thus-obtained resin composition was cooled, and then formed into a sample for evaluation of brittleness with a thickness of 400 to 450 μm by hot-press molding.

Further, 100 parts by weight of the resulting kneaded product was mixed with 2 parts by weight of a chromium-containing metallic dye [BONTRON S-34 made by Orient Chemical Industries, Co., Ltd.] and 7 parts by weight of carbon black [MA-100 made by Mitsubishi Chemical Corp.). The mixture was then kneaded with a LABOPLAS-TMILL having an inner temperature of 120° C., cooled, and then coarsely crushed using a feather mill. Subsequently, this was finely divided with a jet mill, and classified with an air classifier to obtain toner particles having an average particle diameter of 10 μm.

To 100 parts by weight of the thus-obtained toner particles, 0.5 part by weight of titania fine particles [Idemitsu Titania made by Idemitsu Petrochemical Co., Ltd.] was added as conductive fine particles, and they were mixed with a Henschel mixer to obtain a toner for development of an electrostatically charged image.

When this toner was evaluated as a toner for two-component development system, a polyethylene coat carrier [Idemitsu Carrier made by Idemitsu Petrochemical Co., Ltd.] was used as a carrier.

The thus-obtained toner particles and toner were evaluated with respect to the following items. The results are shown in Table I-I.

(1) Low-temperature Fixability (Lowest Fixing Temperature) and Offset Resistance A commercial printer [FS-600 manufactured by Kyosera] was remodeled such that the temperature of the heating roll portion was variable, and used as a tester for measuring the lowest fixing temperature and the offset generating temperature. The lowest fixing temperature and the offset generating temperature of the toner were measured using this tester.

(2) Charge Stability

One hundred grams of the above-obtained two-component developer (toner mixing ratio; 5%) was charged into a polyethylene container having an internal volume of 100 ml, and stirred with a ball mill stand at 100 rpm for 1 hour under conditions, namely, a high temperature and high humidity [temperature 30° C.; humidity 80% (indicated at HH in Table I-1], a normal temperature and normal humidity [temperature 20° C.; humidity 50% (indicated at NN in Table I-1] and a low temperature and low humidity [temperature 10° C.; humidity 20% (indicated at LL in Table I-1)]. Then, a charge amount was evaluated with a blow-off charge amount measuring device [TB-200 manufactured by Toshiba Chemical Corp.]

(3) Brittleness

The above-obtained sample for evaluation of brittleness was cut to pieces having a size of 10 mm×10 mm. The test was conducted with a Vickers hardness meter by changing the load to 100 gf, 200 gf, 300 gf, 500 gf and 1,000 gf in order to observe a break state of the test pieces.

In this test, a break mark with a length of 2 mm or more which occurred in a test piece was defined as "break", a break mark in which occurrence of visible crack was observed was defined as "visible-crack", and a break mark which could be identified by only an optical microscope with 100' magnification was defined as "microcrack". Of these, brittleness was evaluated with a value of the lowest load under which "break" occurred.

(4) Thermal Properties

A glass transition temperature (indicated at Tg in Table I-1) and a heat-softening point (indicated at Tm in Table I-1) were measured.

EXAMPLE I-2

A sample for evaluation of brittleness and a sample of a toner were produced and evaluated as in Example I-1 except that in Example I-1, the amount of hydrogenated resin [IIb] used as a starting component was changed to 95 g, the amount of polystyrene used was changed to 5 g and a resin composition with a composition ratio of both components A and B; [A/(A+B)] =0.95 was provided. The results of evaluation of the low-temperature fixability, the charge stability and the brittleness are shown in Table I-1.

EXAMPLE I-3

A sample for evaluation of brittleness and a sample of a toner were produced and evaluated as in Example I-1 except that in Example I-1, the amount of hydrogenated resin [IIb] used as a starting component was changed to 85 g, the polystyrene component was changed to 15 g of polystyrene [IDEMITSU PSHF 10 made by Idemitsu Petrochemical Co., Ltd.] having a weight-average molecular weight of 100,000 and a resin composition with a composition ratio of both components A and B; [A/(A+B)]=0.85 was provided. The results of evaluation of the low-temperature fixability, the charge stability and the brittleness are shown in Table I-1.

EXAMPLE I-4

A sample for evaluation of brittleness and a sample of a toner were produced and evaluated as in Example I-1 except that in Example I-1, the amount of hydrogenated resin [IIb] used as a starting component was changed to 71 g and the amount of the same compound as that in Example I-3 as a polystyrene component was changed to 29 g. The results of evaluation of the low-temperature fixability, the charge stability and the brittleness are shown in Table I-1.

EXAMPLE I-5

A sample for evaluation of brittleness and a sample of a toner were produced and evaluated as in Example I-1 except that in Example I-1, the amount of hydrogenated resin [IIb] used as a starting component was changed to 56 g, the amount of the same compound as that in Example I-3 as a polystyrene component was changed to 44 g and a resin composition with a composition ratio of both components A and B; [A/(A+B)]=0.56 was provided. The results of evaluation of the low-temperature fixability, the charge stability and the brittleness are shown in Table I-1.

EXAMPLE I-6

A sample for evaluation of brittleness and a sample of a toner were produced and evaluated as in Example I-1 except that in Example I-1, the amount of hydrogenated resin [IIb] used as a starting component was changed to 71 g and a polystyrene component was changed to 29 g of polystyrene [HIMER SB-150 made by Sanyo Chemical Industries, Ltd.] having a weight-average molecular weight of 65,000. The results of evaluation of the low-temperature fixability, the charge stability and the brittleness are shown in Table I-1.

EXAMPLE I-7

A sample for evaluation of brittleness and a sample of a toner were produced and evaluated as in Example I-1 except that in Example I-1, the amount of hydrogenated resin [IIb] used as a starting component was changed to 71 g and a polystyrene component was changed to 29 g of polystyrene [HIMER SB-130 made by Sanyo Chemical Industries, Ltd.] having a molecular weight of 45,000. The results of evaluation of the low-temperature fixability, the charge stability and the brittleness are shown in Table I-1.

EXAMPLE I-8

A sample for evaluation of brittleness and a sample of a toner were produced and evaluated as in Example I-1 except that in Example I-1, the amount of hydrogenated resin [IIb] used as a starting component was changed to 30 g, a polystyrene component was changed to 70 g of polystyrene [HIMER SB-130 made by Sanyo Chemical Industries, Ltd.] having a molecular weight of 45,000 and a resin composition with a composition ratio of both components A and B; [A/(A+B)]=0.30 was provided. The results of evaluation of the low-temperature fixability, the charge stability and the brittleness are shown in Table I-1.

EXAMPLE I-9

A sample for evaluation of brittleness and a sample of a toner were produced and evaluated as in Example I-1 except that in Example I-1, 71 g of hydrogenated resin [IIa] obtained in Synthesis Example I-2 was used instead of hydrogenated resin [IIb] used as a starting component and the amount of the same compound as that in Example I-3 as a polystyrene component was changed to 29 g. The results of evaluation of the low-temperature fixability, the charge stability and the brittleness are shown in Table I-1.

EXAMPLE I-10

A sample for evaluation of brittleness and a sample of a toner were produced and evaluated as in Example I-1 except that in Example I-1, 71 g of a hydrogenated alicyclic saturated hydrocarbon resin [ARKON P-125 made by Arakawa Chemical Industries, Ltd.] was used instead of hydrogenated resin [IIb] used as a starting component and the amount of the same compound as that in Example I-3 as a polystyrene component was changed to 29 g. The results of evaluation of the low-temperature fixability, the charge stability and the brittleness are shown in Table I-1.

EXAMPLE I-11

A sample for evaluation of brittleness and a sample of a toner were produced and evaluated as in Example I-1 except that in Example I-1, 71 g of a hydrogenated alicyclic saturated hydrocarbon resin [ARKON M-115 made by Arakawa Chemical Industries, Ltd.] was used instead of hydrogenated resin [IIb] used as a starting component and the amount of the same compound as that in Example I-3 as a polystyrene component was changed to 29 g. The results of evaluation of the low-temperature fixability, the charge stability and the brittleness are shown in Table I-1.

EXAMPLE I-12

A sample for evaluation of brittleness and a sample of a toner were produced and evaluated as in Example I-1 except that in Example I-1, 71 g of a hydrogenated alicyclic saturated hydrocarbon resin [Escorez 5320 made by Tonex Co., Ltd.] was used instead of hydrogenated resin [IIb] used as a starting component and the amount of the same compound as that in Example I-3 as a polystyrene component was changed to 29 g. The results of evaluation of the low-temperature fixability, the charge stability and the brittleness are shown in Table I-1.

Comparative Example I-1

A sample for evaluation of brittleness and a sample of a toner were produced and evaluated as in Example I-1 except that in Example I-1, the amount of hydrogenated resin [IIb] used as component A was changed to 100 g and a polystyrene component as component B was not used. The results of evaluation of the low-temperature fixability, the charge stability and the brittleness are shown in Table I-1.

Comparative Example I-2

A sample for evaluation of brittleness and a sample of a toner were produced and evaluated as in Example I-1 except that in Example I-1, hydrogenated resin [IIb] used as component A was not used and 100 g of polystyrene [IDEMITSU PS.HH 30 made by Idemitsu Petrochemical Co., Ltd.] having a weight-average molecular weight of 300,000 as used in Example I-1 was used. The results of evaluation of the low-temperature fixability, the charge stability and the brittleness are shown in Table I-1.

Comparative Example I-3

A sample for evaluation of brittleness and a sample of a toner were produced and evaluated as in Example I-1 except that in Example I-1, hydrogenated resin [IIb] used as component A was not used and 100 g of polystyrene [IDEMITSU PS.HF 10 made by Idemitsu Petrochemical Co., Ltd.] having a weight-average molecular weight of 100,000 as used in Example I-3 was used. The results of evaluation of the low-temperature fixability, the charge stability and the brittleness are shown in Table I-1.

Comparative Example I-4

A sample for evaluation of brittleness and a sample of a toner were produced and evaluated as in Example I-1 except that in Example I-1, the amount of hydrogenated resin [IIb] used as component A was changed to 20 g, 80 g of polystyrene [IDEMITSU PS.HF 10 made by Idemitsu Petrochemical Co., Ltd.] having a weight-average molecular weight of 100,000 as used in Example I-3 was used and a resin composition with a composition ratio of both components A and B; [A/(A+B))=0.20 was provided. The results of evaluation of the low-temperature fixability, the charge stability and the brittleness are shown in Table I-1.

Comparative Example I-5

As a styrene-acrylic toner resin, the styrene-acrylic toner resin described in Nippon Setchaku Gakkaishi, vol. 23, No. 12, pp. 489–497 (1987) was formed to obtain a sample for evaluation. In the thus-formed styrene-acrylic toner resin, a ratio of a structural unit derived from styrene to a structural unit derived from butyl methacrylate was 65:35, a weight-average molecular weight was 86,000, and a glass transition temperature was 61° C. The results of evaluation of the low-temperature fixability, the charge stability and the brittleness conducted on the sample for evaluation of brittleness and the sample of the toner are shown in Table I-1.

Comparative Example I-6

A sample for evaluation of brittleness and a sample of a toner were produced and evaluated as in Example I-1 using a polyester-based toner resin obtained by tracing Example I-2 described in Japanese Patent Laid-Open No. 51,027/ 1986. The results of evaluation of the low-temperature fixability, the charge stability and the brittleness are shown in Table I-1.

used as component (b) is as follows. That is, when the petroleum resin-based polymer as component (b) formed a resin composition with the polystyrene-type polymer as component (a) at a weight ratio of 1:1, total light transmission measured according to JIS K 7105 on a film-like molded product of the resin composition having a thickness of 3 mm was 91% of a quantity of incident light, and haze measured according to JIS K 7105 was 1.1%. Further, 5.2 kg of an aromatic petrochemical resin [FTR-8120 made by Mitsui Chemicals, Inc.] having a softening temperature of 120° C. and a Hazen color number of 50 as measured according to JIS K 6901 and using a purified aromatic compound component with a specific structure as a starting material was used.

Both of these components (a) and (b) were mixed in a pelletized state, fed to a twin-screw extruder (Labotex manufactured by The Japan Steel Works, Ltd.; screw diameter·32 mm], and melt-kneaded at a resin temperature of 160° C. to obtain a resin composition.

[2] Evaluation of a Resin Composition (A) Measurement of Total Light Transmission and Haze The resin composition (32 g) obtained in (1) was subjected to hot-press molding to produce a test piece for measuring total light transmission. In the hot-press molding, a hot press manufactured by Shimadzu Rika Kikai K.K. and a mold having a size of 100 mm×100 mm×3 mm were used. The molding was conducted under conditions of a mold temperature of 140° C., a press pressure of 50 to 70 kgf/cm² and a molding time of 10 minutes.

Total light transmission and haze were measured according to JIS K 7105 with a fully automatic direct reading haze

TABLE I-1

| Example (Comparative Example) | Lowest fixing temperature (° C.) | Offset generating temperature (° C.) | Charge amount (μC/g) | | | Brittleness (times/10 tests) | | | Thermal properties | |
|---|---|---|---|---|---|---|---|---|---|---|
| | | | LL | NN | HH | 300 gf | 500 gf | 1,000 gf | Tg (° C.) | Tm (° C.) |
| I-1 | 125 | 210< | −26 | −25 | −25 | 0 | 2 | 8 | 65 | 120 |
| I-2 | 115 | 205 | −25 | −25 | −24 | 0 | 4 | 10 | 60 | 105 |
| I-3 | 115 | 210< | −25 | −25 | −24 | 0 | 5 | 10 | 61 | 105 |
| I-4 | 120 | 210< | −25 | −25 | −25 | 0 | 2 | 10 | 62 | 110 |
| I-5 | 125 | 210< | −25 | −25 | −24 | 0 | 0 | 9 | 64 | 115 |
| I-6 | 115 | 210< | −26 | −25 | −25 | 0 | 9 | 10 | 60 | 110 |
| I-7 | 115 | 210< | −25 | −25 | −24 | 0 | 10 | 10 | 60 | 105 |
| I-8 | 130 | 210< | −26 | −26 | −25 | 0 | 4 | 10 | 63 | 125 |
| I-9 | 120 | 210< | −25 | −25 | −24 | 0 | 1 | 8 | 61 | 110 |
| I-10 | 120 | 210< | −25 | −24 | −24 | 0 | 3 | 8 | 62 | 110 |
| I-11 | 115 | 210< | −26 | −25 | −25 | 1 | 10 | 10 | 61 | 105 |
| I-12 | 120 | 210< | −26 | −25 | −25 | 0 | 8 | 10 | 60 | 110 |
| (I-1) | 120 | 160 | −25 | −25 | −24 | 10 | 10 | 10 | 66 | 110 |
| (I-2) | 190 | 210< | −25 | −25 | −24 | 0 | 0 | 0 | 100 | 160 |
| (I-3) | 175 | 210< | −25 | −25 | −24 | 0 | 0 | 2 | 90 | 140 |
| (I-4) | 140 | 210< | −26 | −25 | −25 | 0 | 1 | 4 | 80 | 130 |
| (I-5) | 165 | 210< | −26 | −25 | −22 | 0 | 7 | 10 | 66 | 150 |
| (I-6) | 140 | 210< | −28 | −25 | −21 | 0 | 8 | 10 | 64 | 130 |

II. Second Invention

EXAMPLE II-1

[1] Production of a Resin Composition (a) Polystyrene [HF-10 made by Idemitsu Petrochemical Co., Ltd., 4.8 kg] having a weight-average molecular weight of 210,000 was used as a polystyrene-type polymer as component (a). Further, a petroleum resin-based polymer computer [Model HGM-2DP manufactured by SUGA TEST INSTRUMENTS Co., Ltd.] using the thus-obtained film-like test pieces 3 mm in thickness.

(B) Measurement of Weight Loss at 150° C.

With respect to the resin composition obtained in (1), the change in weight was observed in air with a thermogravimetry device [TG/DTA 300 manufactured by Seiko Instruments & Electronics Ltd.] when a temperature was raised from room temperature to 600° C. at a rate of rise of 10°

C./min. A weight loss ratio (percentage) of an amount of change in weight at 150 C. to initial weight was measured.

(C) Measurement of a Glass Transition Temperature

With respect to the resin composition obtained in (1), an extrapolation glass transition starting temperature in second heating was measured according to JIS K 7121 using a differential scanning calorimeter [manufactured by Seiko Instruments & Electronics Ltd.] by increasing the temperature at a rate of rise of 10° C./10 min.

(D) Measurement of a Softening Temperature

The resin composition obtained in (1) was measured with a flow tester softening temperature measuring device manufactured by Shimadzu Rika Kikai K.K. The measurement conditions were that load was 20 kgf, an orifice diameter was 1.0 mm, a length was 1.0 mm, a plunger area was 1.0 cm², a sample amount was 1.0 g, a starting temperature was 80° C., a rate of rise was 6.0° C./min and preheating was conducted for 200 seconds. And, an outflow starting temperature and a ½ outflow temperature were read from a measurement time-temperature chart and a measurement time-piston displacement chart.

The results of evaluation are shown in Table II-1.

[3] Production of a Toner for Development of an Electrostatically Charged Image

One hundred parts by weight of the resin composition obtained in (1) was mixed with 2 parts by weight of a chromium-containing metallic dye [BONTRON S-34 made by Orient Chemical Industries, Co., Ltd.], 5 parts by weight of polypropylene wax [Biscol 550 made by Sanyo Chemical Industries, Ltd.] as wax and 7 parts by weight of carbon black [MA-100 made by Mitsubishi Chemical Corp.) as a colorant. The mixture was kneaded at a resin temperature of 160° C. with a LABOPLASTMILL.

This kneaded product was then coarsely crushed using a feather mill. And, this coarsely crushed product was pulverized with a jet mill, and classified with an air classifier to obtain toner particles having a volume-average particle diameter of 10 μm.

To 100 parts by weight of the thus-obtained toner particles, 0.5 part by weight of titania fine particles [Idemitsu Titania made by Idemitsu Petrochemical Co., Ltd.] was then added as a fluidity imparting agent, and they were mixed with a Henschel mixer to obtain a toner for development of an electrostatically charged image.

When this toner was evaluated as a toner for two-component development system, a polyethylene coat carrier [Idemitsu Carrier made by Idemitsu Petrochemical Co., Ltd.] was used as a carrier.

[4] Evaluation of a Toner for Development of an Electrostatically Charged Image (A) Evaluation of Mechanical Strength The suitability of the mechanical strength of the toner was evaluated from the pulverization pressure with the jet mill in the pulverization and the amount of the finely divided component with the particle diameter of less than 5 μm which was removed with an air classifier in (2). When the jet mill pulverization pressure had to be increased, the mechanical strength was estimated to be "too strong", and when the amount of the finely divided component was large, the mechanical strength was estimated to be "too weak".

(B) Evaluation of Low-temperature Fixability and Offset Resistance

A commercial printer [FS-600 manufactured by Kyocera] was remodeled such that the temperature of the heating roll portion was variable, and used as a tester for measuring the lowest fixing temperature and the offset generating temperature. The lowest fixing temperature and the offset generating temperature of the toner were measured using this tester.

With respect to the low-temperature fixability herein, when the lowest fixing temperature was 145° C. or less, it was estimated to be good (expressed by mark in Table II-1), and when the lowest fixing temperature was 146° C. or more, it was estimated to be bad (expressed by mark x in Table II-1).

Further, with respect to the offset resistance, when an offset generating temperature was 210° C. or more, it was estimated to be good (expressed by mark in Table II-1), and when the offset generating temperature was 209° C. or less, it was estimated to be bad (expressed by mark x in Table II-1).

(C) Evaluation of an Odor

A degree of an odor given off was measured in the evaluation of the low-temperature fixability. When there was no odor at all, it was estimated to be excellent (expressed by mark ⊚ in Table II-1). When fixing was conducted with a fixing machine in an uncovered state and a slight odor was smelled but no odor was smelled in a common use state, it was estimated to be good (expressed by mark ○ in Table II-1). When an odor was smelled in fixation, it was estimated to be bad (expressed by mark x in Table II-1).

(D) Evaluation of Transparency

When color reproducibility of transmitted light was excellent in using a toner as a color toner, transparency was estimated to be excellent (expressed by mark ⊚ in Table II-1). When scattering of transmitted light less occurred with no problem in the use as a color toner but an image was slightly dark, transparency was estimated to be good (expressed by mark ○ in Table II-1). When an image was cloudy or colored with poor color reproducibility, transparency was estimated to be bad (expressed by mark x in Table II-1).

EXAMPLE II-2

Example II-1 was repeated except that in Example II-1, the amount of polystyrene used as component (a) was changed to 1.5 kg and the amount of the petroleum resin used as component (b) was changed to 8.5 kg.

The results of evaluation of the thus-obtained resin composition and toner are shown in Table II-1.

EXAMPLE II-3

In Example II-1, the amount of polystyrene used as component (a) was changed to 6.5 kg and the following resin was used as the petroleum resin, component (b). That is, when the resin formed a resin composition with the polystyrene-type polymer as component (a) at a weight ratio of 1:1, total light transmission measured according to JIS K 7105 on a film-like molded product of the resin composition having a thickness of 3 mm was 93% of a quantity of incident light, and haze measured according to JIS K 7105 was 1.3%. Further, Example II-1 was repeated except that the aromatic petrochemical resin was changed to 3.5 kg of an aromatic petrochemical resin [FTR-8100 made by Mitsui Chemicals, Inc.] having a softening temperature of 120° C. and a Hazen color number of 50 and using a purified aromatic compound component with a specific structure as a starting material was used.

The results of evaluation of the thus-obtained resin composition and toner are shown in Table II-1.

EXAMPLE II-4

Example II-1 was repeated except that in Example II-1, 3.0 kg of polystyrene [UP-305 made by Idemitsu Petrochemical Co., Ltd.] having a weight-average molecular weight of 380,000 was used instead of polystyrene used as component (a) and the amount of the petroleum resin used as component (b) was changed to 7.0 kg.

The results of evaluation of the thus-obtained resin composition and toner are shown in Table II-1.

EXAMPLE II-5

Example II-1 was repeated except that in Example II-1, a styrene-butyl methacrylate copolymer resin obtained by copolymerizing styrene and butyl methacrylate as monomers at a molar ratio of 75:25 and having a weight-average molecular weight of 110,000 was used.

The results of evaluation of the thus-obtained resin composition and toner are shown in Table II-1.

EXAMPLE II-6

In Example II-1, the following resin was used instead of the petroleum resin as component (b). That is, when the resin formed a resin composition with the polystyrene-type polymer as component (a) at a weight ratio of 1:1, total light transmission measured according to JIS K 7105 on a film-like molded product of the resin composition having a thickness of 3 mm was 86% of a quantity of incident light, and haze measured according to JIS K 7105 was 5.3%. Further, Example II-1 was repeated except that an ester group-containing polydicyclopentadiene-based petroleum resin [Quintone 1500 made by Nippon Zeon Co., Ltd.] having a softening temperature of 100° C., a saponification value of 175 mg KOH/g and a Gardner color number of 3 as measured in a molten state according to JIS K 5400 was used.

The results of evaluation of the thus-obtained resin composition and toner are shown in Table II-1.

EXAMPLE II-7

The petroleum resin as component (b) was formed as follows.

Xylene (154 g) was fed as a solvent to a nitrogen-purged 1-liter polymerization reactor fitted with a stirrer. To this was added a mixture of 269 g of cyclopentadiene and 269 g of styrene successively over 2 hours while being heat-stirred at 230° C. Then, the reaction solution was heated to 260° C. over 105 minutes, and the reaction was conducted for 4 hours.

After the completion of the reaction, the purified reaction solution was withdrawn, and an unreacted monomer and xylene were removed at 200° C. and 1 mmHg using a rotary evaporator to obtain 510 g of a copolymer of cyclopentadiene and styrene.

Subsequently, a nitrogen-purged 300-milliliter polymerization reactor fitted with a stirrer was charged with 75 g of cyclohexane as a solvent, 75 g of the copolymer of cyclopentadiene and styrene and 4.0 g of a silin-alumina catalyst supporting 0.5% by weight of platinum. A hydrogen gas was introduced therein at a pressure of 4 MPa, and a hydrogenation reaction was conducted at 150° C. over 2 hours.

The thus-obtained hydrogenated cyclopentadiene-styrene copolymer was as follows. That is, when the copolymer formed a resin composition with the polystyrene-type polymer as component (a) at a weight ratio of 1:1, total light transmission measured according to JIS K 7105 on a film-like molded product of the resin composition having a thickness of 3 mm was 90.3% of a quantity of incident light, and haze measured according to JIS K 7105 was 4.1%. Further, a softening temperature was 120° C., an aromatic component content was 43% by weight, a bromine value was 14 g/100 g, and a Gardener color number was 3.

Example II-1 was repeated except that component (a) in Example II-1 and the above-obtained petroleum resin as component (b) were used.

The results of evaluation of the thus-obtained resin composition and toner are shown in Table II-1.

EXAMPLE II-8

The following resin was used as the petroleum resin, component (b) instead of the petroleum resin used as component (b) in Example II-1. That is, when the resin formed a resin composition with the polystyrene-type polymer as component (a) at a weight ratio of 1:1, total light transmission measured according to JIS K 7105 on a film-like molded product of the resin composition having a thickness of 3 mm was 74% of a quantity of incident light, and haze measured according to JIS K 7105 was 3.2%. Further, Example II-1 was repeated except that an aromatic petroleum resin [Petrotack 90 made by Tosoh Corp.] having a softening temperature of 90° C. and a Gardener color number of 6 was used.

The results of evaluation of the thus-obtained resin composition and toner are shown in Table II-1.

EXAMPLE II-9

The following resin was used as the petroleum resin, component (b) instead of the petroleum resin used as component (b) in Example II-1. That is, when the resin formed a resin composition with the polystyrene-type polymer as component (a) at a weight ratio of 1:1, total light transmission measured according to JIS K 7105 on a film-like molded product of the resin composition having a thickness of 3 mm was 72% of a quantity of incident light, and haze measured according to JIS K 7105 was 6.1%. Further, Example II-1 was repeated except that an aromatic petroleum resin [Petcoal 120 made by Tosoh Corp.] having a softening temperature of 120° C. and a Gardener color number of 7 was used.

The results of evaluation of the thus-obtained resin composition and toner are shown in Table II-1.

EXAMPLE II-10

The following resin was used as the petroleum resin, component (b) instead of the petroleum resin used as component (b) in Example II-1. That is, when the resin formed a resin composition with the polystyrene-type polymer as component (a) at a weight ratio of 1:1, total light transmission measured according to JIS K 7105 on a film-like molded product of the resin composition having a thickness of 3 mm was 66.2% of a quantity of incident light, and haze measured according to JIS K 7105 was 4.9%. Further, Example II-1 was repeated except that an aromatic petroleum resin [HIRESIN #90 made by Toho Kagaku Kogyo K.K.] having a softening temperature of 100° C. and a Gardener color number of 8 was used.

The results of evaluation of the thus-obtained resin composition and toner are shown in Table II-1.

EXAMPLE II-11

The following resin was used as the petroleum resin, component (b) instead of the petroleum resin used as component (b) in Example II-1. That is, when the resin formed a resin composition with the polystyrene-type polymer as component (a) at a weight ratio of 1:1, total light transmission measured according to JIS K 7105 on a film-like molded product of the resin composition having a thickness of 3 mm was 91% of a quantity of incident light, and haze measured according to JIS K 7105 was 1.2%. Further, Example II-1 was repeated except that a petroleum resin obtained by copolymerizing α-methylstyrene and isopropenyltoluene as monomers at a molar ratio of 1:1 as described below and having a softening temperature of 96° C. was used.

A 500-milliliter flask fitted with a thermometer and a stirrer was charged with 50 g of α-methylstyrene, 50 g of isopropenyltoluene and 200 g of toluene as a solvent. The temperature was maintained at 0° C. while stirring the mixture, and 1.0 g of a boron trifluoride phenol complex was added dropwise thereto for 20 minutes. Further, the reaction was conducted at 0° C. for 2 hours with stirring, and 50 g of a sodium hydroxide aqueous solution having a concentration of 2% by weight was then added to decompose the catalyst. The resulting reaction solution was washed with water, the solvent was distilled off, and an unreacted monomer and a low polymer were removed at 200° C. under reduced pressure of 5 mmHg to obtain an aromatic petroleum resin.

The results of evaluation of the thus-obtained resin composition and toner are shown in Table II-1.

EXAMPLE II-12

The following resin was used as the petroleum resin, component (b) instead of the petroleum resin used as component (b) in Example II-1. That is, when the resin formed a resin composition with the polystyrene-type polymer as component (a) at a weight ratio of 1:1, total light transmission measured according to JIS K 7105 on a film-like molded product of the resin composition having a thickness of 3 mm was 87% of a quantity of incident light, and haze measured according to JIS K 7105 was 4.3%. Further, Example II-1 was repeated except that a petroleum resin obtained by copolymerizing indene and vinyltoluene as monomers at a molar ratio of 1:3 as described below and having a softening temperature of 100° C. was used.

A 500-milliliter flask fitted with a thermometer and a stirrer was charged with 25 g of indene, 75 g of vinyltoluene and 200 g of toluene as a solvent. The temperature was maintained at 0° C. while stirring the mixture, and 1.0 g of a boron trifluoride phenol complex was added dropwise thereto for 20 minutes. Further, the reaction was conducted at 0° C. for 2 hours with stirring, and 50 g of a sodium hydroxide aqueous solution having a concentration of 2% by weight was then added to decompose the catalyst. The resulting reaction solution was washed with water, the solvent was distilled off, and an unreacted monomer and a low polymer were removed at 200° C. under reduced pressure of 5 mmHg to obtain an aromatic petroleum resin.

The results of evaluation of the thus-obtained resin composition and toner are shown in Table II-1.

EXAMPLE II-13

The following resin was used instead of the petroleum resin used as component (b) in Example II-1. That is, when the resin formed a resin composition with the polystyrene-type polymer as component (a) at a weight ratio of 1:1, total light transmission measured according to JIS K 7105 on a film-like molded product of the resin composition having a thickness of 3 mm was 87% of a quantity of incident light, and haze measured according to JIS K 7105 was 2.8%. Further, it is a hydroxyl group-containing dicyclopentadiene polymer-based petroleum resin ("Quintone 1700" made by Nippon Zeon Co., Ltd., softening temperature 100° C.) having a hydroxyl value of 220 mg KOH/g.

The results of evaluation of the thus-obtained resin composition and toner are shown in Table II-1.

Comparative Example II-1

A petroleum resin as component (b) was produced as follows.

An autoclave having an internal volume of 1 liter was charged with 228 g of xylene, and heated up to 260° C. in an atmosphere of a nitrogen gas. A mixture of 190 g of dicyclopentadiene and 190 g of styrene was added over 2 hours while being stirred. The reaction was further conducted at the same temperature for 4 hours. An unreacted monomer, a low polymer and the solvent were removed from the resulting polymer solution to obtain a dicyclopentadiene-styrene copolymer having a number-average molecular weight of 690, a softening temperature of 110° C., a bromine value of 62 g/100 g and an aromatic ring content of 46% by weight.

Subsequently, an autoclave having an internal volume of 1 liter was charged with 250 g of cyclohexane as a solvent, 250 g of the above-obtained dicyclopentadiene-styrene copolymer and 3.0 g of a nickel-diatomaceous earth catalyst, and a hydrogenation reaction was conducted at a temperature of 230° C. and a hydrogen gas pressure of 40 kg/cm$^2$G over 5 hours. Then, the reaction product was filtered to remove the catalyst, and the solvent was distilled off to obtain a hydrogenated dicyclopentadiene-styrene copolymer. When this copolymer formed a resin composition with the polystyrene-type polymer as component (a) at a weight ratio of 1:1, total light transmission measured according to JIS K 7105 on a film-like molded product of the resin composition having a thickness of 3 mm was 48% of a quantity of incident light, and haze measured according to JIS K 7105 was 92%. The softening temperature was 125° C., the bromine value was 4.4 g/100 g, the aromatic ring content was 24% by weight, and the hydrogenation rate of the aromatic ring was 48%.

Example II-1 was repeated except that polystyrene as component (a) in Example II-1 and the above-obtained petroleum resin as component (b) were used.

The results of evaluation of the thus-obtained resin composition and toner are shown in Table II-1.

Comparative Example II-2

The following resin was used as the petroleum resin, component (b) instead of the petroleum resin used as component (b) in Example II-1. That is, when the resin formed a resin composition with the polystyrene-type polymer as component (a) at a weight ratio of 1:1, total light transmission measured according to JIS K 7105 on a film-like molded product of the resin composition having a thickness of 3 mm was 48% of a quantity of incident light, and haze measured according to JIS K 7105 was 3.1%. Further, the resin composition was produced as in Example II-1 except that a petroleum resin [Petorosin #120 made by Mitsui Chemicals, Inc.] having a softening temperature of 120° C. and a Gardener color number of 11 as measured in a molten condition according to JIS K 5400 was used. The resulting resin composition was colored, and the total light transmission was as low as 47.9%. The results of evaluation of the resin composition obtained herein and a toner produced as in Example II-1 using the same are shown in Table II-1.

Comparative Example II-3

The following resin was used as the petroleum resin, component (b) instead of the petroleum resin used as component (b) in Example II-1. That is, when the resin formed a resin composition with the polystyrene-type polymer as component (a) at a weight ratio of 1:1, total light transmission measured according to JIS K 7105 on a film-like molded product of the resin composition having a thickness of 3 mm was 54% of a quantity of incident light, and haze measured according to JIS K 7105 was 6.3%. Further, the resin composition was produced as in Example II-1 except that a petroleum resin [NEOPOLYMER 120 made by Nisseki Kagaku Kogyo K.K.] having a softening temperature of 120° C. and a Gardener color number of 4 as measured in a toluene solution having a concentration of 2 g/25 ml according to JIS K 5400 was used. The resulting resin composition was colored, and the total light transmission was as low as 53.5%. The results of evaluation of the resin composition obtained herein and a toner produced as in Example II-1 using the same are shown in Table II-1.

a differential scanning calorimeter [manufactured by Seiko Instruments & Electronics Ltd.].

(B) Measurement of a Softening Temperature

The resin composition obtained in (1) was measured in the same manner as described in the second invention. The results of evaluation thereof are shown in Table III-1.

[3] Production of a Toner for Development of an Electrostatically Charged Image

With respect to the resin composition obtained in (1), toner particles having a volume-average particle diameter of 10 μm were obtained in the same manner as described in the second invention.

To 100 parts by weight of the thus-obtained toner particles, 0.5 part by weight of titania fine particles [Idemitsu Titania made by Idemitsu Petrochemical Co., Ltd.] was then added as a fluidity imparting agent, and they were mixed with a Henschel Mixer to obtain a toner for development of an electrostatically charged image.

When this toner was evaluated as a toner for two-component development system, a polyethylene coat carrier [Idemitsu Carrier made by Idemitsu Petrochemical Co., Ltd.] was used as a carrier.

[4] Evaluation of a Toner for Development of an Electrostatically Charged Image

TABLE II-1

| | Resin composition | | | | | | Toner | | | | |
|---|---|---|---|---|---|---|---|---|---|---|---|
| Ex. (Comp. Ex.) | Total light transmission | Haze | Weight loss | Glass transition temperature | Outflow starting temperature | ½ outflow temperature | Low-temperature fixability | Offset resistance | Mechanical strength | Odor | Transparency |
| II-1 | 90.6 | 1.1 | 0.6 | 68 | 121 | 146 | ○ | ○ | suitable | ⊙ | ⊙ |
| II-2 | 90.6 | 6.9 | 0.6 | 63 | 111 | 136 | ○ | ○ | suitable | ⊙ | ⊙ |
| II-3 | 90.3 | 1.3 | 0.7 | 68 | 116 | 140 | ○ | ○ | suitable | ⊙ | ⊙ |
| II-4 | 90.7 | 1.1 | 0.6 | 71 | 124 | 147 | ○ | ○ | suitable | ⊙ | ⊙ |
| II-5 | 87.6 | 6.1 | 0.6 | 63 | 127 | 146 | ○ | ○ | suitable | ⊙ | ⊙ |
| II-6 | 86.0 | 5.3 | 0.7 | 62 | 112 | 136 | ○ | ○ | suitable | ⊙ | ⊙ |
| II-7 | 90.3 | 4.1 | 0.6 | 64 | 119 | 145 | ○ | ○ | suitable | ⊙ | ⊙ |
| II-8 | 73.7 | 3.2 | 1.0 | 60 | 110 | 136 | ○ | ○ | suitable | ○ | ○ |
| II-9 | 72.1 | 6.1 | 1.0 | 71 | 124 | 147 | ○ | ○ | suitable | ○ | ○ |
| II-10 | 66.2 | 4.9 | 1.0 | 58 | 110 | 137 | ○ | ○ | suitable | ○ | ○ |
| II-11 | 90.8 | 1.2 | 0.7 | 60 | 110 | 135 | ○ | ○ | suitable | ⊙ | ⊙ |
| II-12 | 87.2 | 4.3 | 0.7 | 60 | 111 | 135 | ○ | ○ | suitable | ⊙ | ⊙ |
| II-13 | 85.1 | 4.6 | 0.7 | 62 | 112 | 136 | ○ | ○ | suitable | ⊙ | ⊙ |
| (II-1) | 47.6 | 91.5 | 0.7 | 64 | 123 | 147 | ○ | ○ | suitable | ⊙ | x |
| (II-2) | 47.9 | 3.1 | 1.5 | 71 | 121 | 147 | ○ | ○ | suitable | x | x |
| (II-3) | 53.5 | 6.3 | 1.7 | 71 | 124 | 147 | ○ | ○ | suitable | x | x |

III. Third Invention

EXAMPLE III-1

[1] Production of a Resin Composition

Polystyrene [HF-10 made by Idemitsu Petrochemical Co., Ltd., 4.5 kg] having a weight-average molecular weight of 210,000 was used as a polystyrene-type polymer, component (B). Further, 5.5 kg of a terpene phenol resin [Mighty Ace G125 made by Yasuhara Chemical K.K.] using dipentene as a starting material and having a softening temperature of 120° C. was used as a terpene resin, component (A).

After both these components (A) and (B) were mixed in a pelletized state, the mixture was fed to a twin-screw extruder [Labotex manufactured by The Japan Steel Works, Ltd.; screw diameter·30 mm], and melt-kneaded at a resin temperature of 160° C. to obtain a resin composition.

[2] Evaluation of a Resin Composition (A) Measurement of a Glass Transition Temperature The resin composition obtained in (1) was measured in the same manner as described in the second invention using (A) Evaluation of Mechanical Strength Evaluated in the same manner as described in the second invention.

(B) Low-temperature Fixability and Offset Resistance

Evaluated in the same manner as described in the second invention.

EXAMPLE III-2

Example III-1 was repeated except that a hydrogenated aromatic modified terpene resin [Clearon K-110 made by Yasuhara Chemical K.K.] having a softening temperature of 110° C. was used as a terpene resin, component (A)(a).

The results of evaluation of the thus-obtained resin composition and toner are shown in Table III-1.

EXAMPLE III-3

Example III-1 was repeated except that an aromatic modified terpene resin [YS Resin TO-115 made by Yasuhara Chemical K.K.] having a softening temperature of 115° C. was used as a terpene resin, component (A)(a).

The results of evaluation of the thus-obtained resin composition and toner are shown in Table III-1.

EXAMPLE III-4

Example III-1 was repeated except that a terpene phenol resin [YS Polystar T115 made by Yasuhara Chemical K.K.] using α-pinene as a starting material and having a softening temperature of 115° C. was used as a terpene resin, component (A)(a).

The results of evaluation of the thus-obtained resin composition and toner are shown in Table III-1.

EXAMPLE III-5

Example III-1 was repeated except that a terpene phenol resin [YS Resin Px-1000 made by Yasuhara Chemical K.K.] using β-pinene and dipentene as starting materials and having a softening temperature of 100° C. was used as a terpene resin, component (A)(a).

The results of evaluation of the thus-obtained resin composition and toner are shown in Table III-1.

EXAMPLE III-6

Example III-1 was repeated except that the terpene resin used as component (A)(a) was replaced with an ester gum [Pencel made by Arakawa Chemical Industries, Ltd.] having a softening temperature of 115° C. as a rosin resin, component (A)(b).

The results of evaluation of the thus-obtained resin composition and toner are shown in Table III-1.

EXAMPLE III-7

Example III-1 was repeated except that the terpene resin used as component (A)(a) was replaced with a rosin-maleic acid resin [acid value 100] having a softening temperature of 113° C. as a rosin resin, component (A)(b).

The results of evaluation of the thus-obtained resin composition and toner are shown in Table III-1.

EXAMPLE III-8

Example III-1 was repeated except that the terpene resin used as component (A)(a) was replaced with a hydrogenated aromatic petroleum resin [Regalite S5100 made by Hercules] having a softening temperature of 100° C. as a hydrogenated aromatic petroleum resin, component (A)(c).

The results of evaluation of the thus-obtained resin composition and toner are shown in Table III-1.

EXAMPLE III-9

Example III-1 was repeated except that the terpene resin used as component (A)(a) was replaced with a hydrogenated aromatic petroleum resin [ARKON M100 made by Arakawa Chemical Industries, Ltd.] having a softening temperature of 100° C. as a hydrogenated aromatic petroleum resin, component (A)(c).

The results of evaluation of the thus-obtained resin composition and toner are shown in Table III-1.

EXAMPLE III-10

Example III-1 was repeated except that polystyrene used as component (B) in Example III-1 was replaced with a styrene-butyl methacrylate copolymer resin obtained by copolymerizing styrene and butyl methacrylate as monomers at a molar ratio of 75:25 and having a weight-average molecular weight of 110,000 and the terpene resin used as component (A)(a) was replaced with a hydrogenated aromatic petroleum resin [ARKON M100 made by Arakawa Chemical Industries, Ltd.] having a softening temperature of 100° C. as a hydrogenated aromatic petroleum resin, component (A)(c).

The results of evaluation of the thus-obtained resin composition and toner are shown in Table III-1.

EXAMPLE III-11

Example III-1 was repeated except that in Example III-1, polystyrene used as component (B) was replaced with 3.0 kg of a polyester resin (glass transition temperature=64° C., softening point=130° C.) formed by the method described in Example III-1 of Japanese Patent Laid-Open No. 225,520/1990 and the terpene resin used as component (A)(a) was replaced with a hydrogenated aromatic petroleum resin [Regalite S5100 made by Hercules] having a softening temperature of 100° C. as a hydrogenated aromatic petroleum resin, component (A)(c).

The results of evaluation of the thus-obtained resin composition and toner are shown in Table III-1.

Comparative Example III-1

A toner was produced as in Example III-1 except that 10 kg of the styrene-acrylic resin used in Example III-10 was used as a binder resin.

The results of evaluation of the resin used herein and the resulting toner are shown in Table III-1.

Comparative Example III-2

A toner was produced as in Example III-1 except that 10 kg of the polyester resin used in Example III-11 was used as a binder resin.

The results of evaluation of the resin used herein and the resulting toner are shown in Table III-1.

TABLE III-1

| | Resin composition | | | Toner | | |
|---|---|---|---|---|---|---|
| Ex. (Comp. Ex.) | Glass transition temperature (° C.) | Outflow starting temperature (° C.) | ½ outflow temperature (° C.) | Low-temperature fixability | Offset resistance | Mechanical strength |
| III-1 | 68 | 120 | 144 | ○ | ○ | suitable |
| III-2 | 62 | 117 | 139 | ○ | ○ | suitable |
| III-3 | 59 | 122 | 142 | ○ | ○ | suitable |
| III-4 | 63 | 118 | 142 | ○ | ○ | suitable |
| III-5 | 60 | 117 | 140 | ○ | ○ | suitable |
| III-6 | 61 | 116 | 137 | ○ | ○ | suitable |
| III-7 | 58 | 117 | 139 | ○ | ○ | suitable |
| III-8 | 62 | 115 | 136 | ○ | ○ | suitable |
| III-9 | 63 | 115 | 137 | ○ | ○ | suitable |
| III-10 | 58 | 115 | 137 | ○ | ○ | suitable |
| III-11 | 57 | 106 | 127 | ○ | ○ | suitable |
| (III-1) | 65 | 120 | 150 | x | ○ | suitable |
| (III-2) | 64 | 107 | 133 | ○ | ○ | too strong |

INDUSTRIAL APPLICABILITY

As has been thus far described, the toner binder resin of the first invention is a toner binder resin for development of an electrostatically charged image which is used for developing an electrostatic latent image formed in an electrophotographic method, an electrostatic recording method, an electrostatic printing method or the like. And, a toner obtained by using the same has excellent effects that the low-temperature fixability is excellent, the mechanical strength capable of enduring the practical use as a toner is provided and the environmental dependence in charging a toner is low.

Further, the resin composition of the second invention is excellent in transparency and suited for use in the toner binder resin for development of an electrostatically charged image which is used for developing an electrostatic latent image formed in an electrophotographic method, an electrostatic recording method, an electrostatic printing method or the like. And, the toner for development of an electrostatically charged image obtained by incorporating suitable amounts of a coloring material, a charge control agent and wax in this resin composition is excellent in low-temperature fixability, has suitable mechanical strength and is substantially transparent. Accordingly, color reproducibility of transmitted light is excellent when it is used as a color toner.

Moreover, the resin composition of the third invention is excellent in low-temperature fixability, has suitable mechanical strength as a toner resin, and is suited for use in a toner binder resin for development of an electrostatically charged image which is used for developing an electrostatic latent image formed in an electrophotographic method, an electrostatic recording method, an electrostatic printing method or the like. And, the toner for development of an electrostatically charged image obtained by incorporating suitable amounts of a coloring material, a charge control agent and wax in this resin composition is excellent in low-temperature fixability without decreasing grindability in the toner production.

What is claimed is:

1. A resin composition comprising a polymer blend which comprises (a) 10 to 65% by weight of a polystyrene-based polymer component and (b) 35 to 90% by weight of the petroleum resin-based polymer component
    wherein the petroleum resin-based polymer component (b) is selected based on a criteria that when the petroleum resin-based polymer forms a resin composition with the polystyrene-based polymer at a weight ratio of 1:1, total light transmission measured according to JIS K 7105 on a film-like molded product of the resin composition having a thickness of 3 mm is 60% or more of a quantity of incident light, and haze measured according to JIS K 7105 is 40% or less.

2. The resin composition as claimed in claim 1, wherein the petroleum resin-based polymer component (b) is selected based on a criteria that when the petroleum resin-based polymer forms a resin composition with the polystyrene-based polymer as component (a) at a weight ratio of 1:1, total light transmission measured according to JIS K 7105 on a film-like molded product of the resin composition having a thickness of 3 mm is 60% or more of a quantity of incident light.

3. The resin composition as claimed in claim 1, which comprises (a) 10 to 49% by weight of the polystyrene-based polymer component and (b) 51 to 90% by weight of the petroleum resin-based polymer component.

4. The resin composition as claimed in claim 1, wherein the polystyrene-based polymer component (a) is a styrene homopolymer and/or a styrene-unsaturated carboxylic ester copolymer in which a ratio of a content of a styrene unit to a content of an unsaturated carboxylic ester unit is 1.1 or more in terms of a molar ratio.

5. The resin composition as claimed in claim 1, wherein the petroleum resin-based polymer component (b) is a petroleum resin-based polymer having a softening temperature of 130° C. or less.

6. The resin composition as claimed in claim 1, wherein the petroleum resin-based polymer component (b) is an aromatic petroleum resin.

7. The resin composition as claimed in claim 1, wherein the petroleum resin-based polymer component (b) is a polymer or a copolymer of one or more selected from the group consisting of vinyltoluene, α-methylstyrene, isopropenyltoluene and indene.

8. The resin composition as claimed in claim 1, wherein the petroleum resin-based polymer component (b) is an ester group-containing dicyclopentadiene polymer-based petroleum resin having a saponification value of 10 to 400 mg KOH/g.

9. The resin composition as claimed in claim 1, wherein the petroleum resin-based polymer component (b) is a hydroxyl group-containing dicyclopentadiene polymer-based petroleum resin having a hydroxyl value of 10 to 400 mg KOH/g.

10. The resin composition as claimed in claim 1, wherein the petroleum resin-based polymer component (b) is one in which a part or the whole of the unsaturated bond and/or the aromatic ring is hydrogenated.

11. The resin composition as claimed in claim 1, wherein the petroleum resin-based polymer component (b) is a petroleum resin-based polymer having weight loss of 1% by weight or less as measured at 150° C. by thermogravimetry.

* * * * *